(12) United States Patent
Daniel et al.

(10) Patent No.: US 12,455,341 B2
(45) Date of Patent: Oct. 28, 2025

(54) LOCATION OF AN ACOUSTIC SOURCE

(71) Applicant: Orange, Issy-les-Moulineaux (FR)

(72) Inventors: Jérome Daniel, Chatillon (FR); Srdan Kitic, Chatillon (FR)

(73) Assignee: Orange, Issy-les-Moulineaux (FR)

(*) Notice: Subject to any disclaimer, the term of this patent is extended or adjusted under 35 U.S.C. 154(b) by 257 days.

(21) Appl. No.: 18/251,967

(22) PCT Filed: Oct. 15, 2021

(86) PCT No.: PCT/FR2021/051801
§ 371 (c)(1),
(2) Date: May 5, 2023

(87) PCT Pub. No.: WO2022/106765
PCT Pub. Date: May 27, 2022

(65) Prior Publication Data
US 2024/0012093 A1     Jan. 11, 2024

(30) Foreign Application Priority Data
Nov. 19, 2020 (FR) .................................. 2011874

(51) Int. Cl.
*G01S 5/22* (2006.01)
(52) U.S. Cl.
CPC ..................... *G01S 5/22* (2013.01)
(58) Field of Classification Search
None
See application file for complete search history.

(56) References Cited

U.S. PATENT DOCUMENTS 9,820,043 B2 * 11/2017 Kanamori ........... G10L 21/0232
9,838,790 B2 * 12/2017 Palacino ................ H04R 3/005
(Continued)

FOREIGN PATENT DOCUMENTS

FR    1911723 A1    4/2021
JP    2004012151 A    1/2004
(Continued)

OTHER PUBLICATIONS

International Search Report dated Feb. 16, 2022 for corresponding International Application No. PCT/FR2021/051801, filed Oct. 15, 2021.
Written Opinion of the International Searching Authority dated Feb. 16, 2022 for corresponding International Application No. PCT/FR2021/051801, filed Oct. 15, 2021.
(Continued)

*Primary Examiner* — Isam A Alsomiri
*Assistant Examiner* — Jonathan D Armstrong
(74) *Attorney, Agent, or Firm* — David D. Brush; Westman, Champlin & Koehler, P.A.

(57) ABSTRACT

A method of processing audio signals acquired by at least one microphone to locate a sound source in a space having a wall. The method includes applying a time-frequency transform to the acquired signals and expressing a general complex velocity vector with a real part and an imaginary part in the frequency domain. The vector has a denominator with a component other than an omnidirectional component and characterizes a composition between: a first acoustic path, direct between the source and the microphone, represented by a first vector, and a second acoustic path resulting from a reflection on the wall and represented by a second vector. The second path has a delay relative to the direct path. A direction of the direct path, a distance from the source to the microphone, and/or a distance from the source to the wall is determined as a function of the delay and the vectors.

18 Claims, 10 Drawing Sheets

(56) References Cited

U.S. PATENT DOCUMENTS

| | | | |
|---|---|---|---|
| 10,901,063 B2* | 1/2021 | Helwani | G01S 3/8083 |
| 11,081,126 B2 | 8/2021 | Baque et al. | |
| 11,646,048 B2* | 5/2023 | Guerin | G10L 21/14 |
| | | | 381/92 |
| 12,025,720 B2* | 7/2024 | Daniel | H04R 3/005 |
| 2011/0317522 A1* | 12/2011 | Florencio | G01S 3/8006 |
| | | | 367/129 |
| 2012/0195436 A1* | 8/2012 | Nakadai | H04R 3/005 |
| | | | 381/56 |
| 2016/0277836 A1* | 9/2016 | Palacino | H04R 5/027 |
| 2018/0330588 A1* | 11/2018 | Kitic | G08B 13/1618 |
| 2020/0152222 A1 | 5/2020 | Baque et al. | |
| 2021/0256990 A1* | 8/2021 | Guerin | G10L 25/18 |
| 2023/0026881 A1* | 1/2023 | Daniel | H04R 3/005 |

FOREIGN PATENT DOCUMENTS

| | | |
|---|---|---|
| WO | 2014076430 A1 | 5/2014 |
| WO | 2018224739 A1 | 12/2018 |
| WO | 2019239043 A1 | 12/2019 |

OTHER PUBLICATIONS

English translation of the Written Opinion of the International Searching Authority dated Feb. 16, 2022 for corresponding International Application No. PCT/FR2021/051801, filed Oct. 15, 2021.
Japanese Notice of Reasons or Rejection dated Jun. 24, 2025 for corresponding Japanese Application No. 2023-530282.
Daniel, Jerome et al., "Time Domain Velocity Vector for Retracing the Multipath Propagation," ICASSP 2020, IEEE, May 2020, pp. 421-425.

* cited by examiner

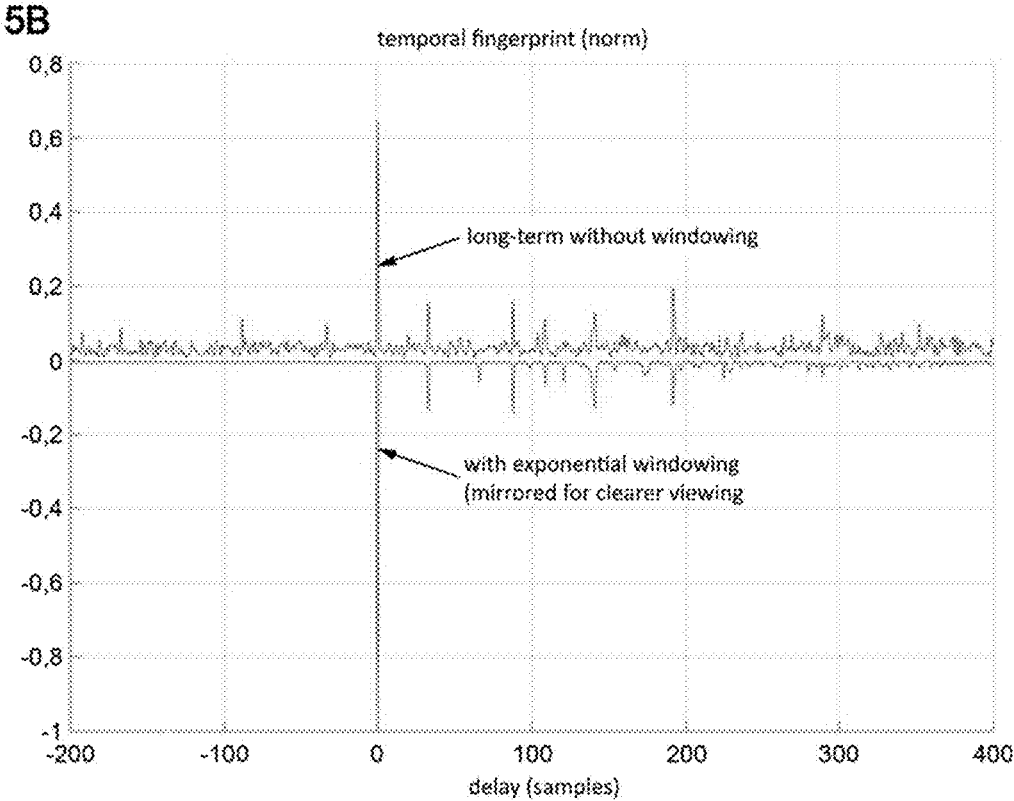

LOCATION OF AN ACOUSTIC SOURCE

CROSS-REFERENCE TO RELATED APPLICATIONS

This Application is a Section 371 National Stage Application of International Application No. PCT/FR2021/051801, filed Oct. 15, 2021, which is incorporated by reference in its entirety and published as WO 2022/106765 A1 on May 27, 2022, not in English.

FIELD OF THE DISCLOSURE

This invention relates to the field of locating acoustic sources, in particular for the estimation of acoustic direction or "DoA" (Direction of Arrival) by a compact microphone system (for example a microphone capable of picking up sounds in a "ambiophonic" or "ambisonic" representation as used below).

BACKGROUND OF THE DISCLOSURE

One possible application is for example beamforming, which then involves a spatial separation of sound sources, in particular to improve speech recognition (for example for a virtual assistant via voice interaction). Such processing can also be used in 3D audio coding (pre-analysis of a sound scene in order to encode the main signals individually), or to allow the spatial editing of immersive sound content possibly in audiovisual (for artistic, radiophonic, cinematic, or other purposes). It also allows tracking a person speaking in a teleconference, or detecting sound events (with or without associated video).

In the state of the art which is interested in ambisonic (or equivalent) encoding, most of the approaches are based on spatial components resulting from a frequency analysis (a time-frequency representation typically resulting from processing by short-term Fourier transform or "STFT", or a representation of narrow-band temporal signals resulting from a filter bank).

First-order ambisonic signals are gathered in vector form according to equation Eq.1 given in the ANNEX below. The encoding convention of Eq.1 is presented here for convenience but this is non-limiting since conversions with other conventions can be implemented just as well. Thus, when the field is comparable to a single plane wave coming from a direction described by the unit vector U1 (therefore the direction DoA of the source) and carrying the emitted signal s1(t), it can be written according to equation Eq.2 (ANNEX).

In practice, the signals are analyzed in the frequency domain, frame after frame, which gives the expression Eq.3 (ANNEX), and for the case of a single wave in the form of Eq.4, and by extension for N waves in the form of Eq.5.

One category of methods is based on analysis of the velocity vector V(f) or the intensity vector $\mathbf{1}(f)$ (the first being an alternative version of the second, normalized by the power of the omnidirectional reference component), as expressed in Eq.6 and Eq.7.

The methods which make use of complex frequency samples base the location estimation essentially on the information contained in the real part of such vectors (linked to the active intensity and characteristic of the wave propagation in that it is directly related to the gradient of the phase field).

As for the imaginary part (reactive part associated with the energy gradient), it is considered to be characteristic of stationary acoustic phenomena.

One can indeed see that in the case of a single plane wave, the velocity vector consists of V=U1.

The known method (known as "DirAC") operates either with time samples filtered in sub-bands, in which case they are real and the intensity vector is as well, or with complex frequency samples in which case it is the real part of the intensity vector alone which is used as designating the direction of arrival (or more precisely, its opposite). In addition, the calculation of a so-called "diffuseness" coefficient, linked to the ratio between the norm of the vector and the energy of the sound field, makes it possible to decide whether the information available at the frequency considered is instead characteristic of directional components (in which case the direction of the vector determines the location) or of an "ambience" (field resulting from diffuse reverberation and/or a mix of undifferentiated secondary sound sources).

Another method, denoted "VVM" below, is based on the velocity vector and the statistics of the angular direction of its real part, weighted by certain factors related to the ratio between real and imaginary parts and their norms. A spherical cartography (2D histogram, for example equirectangular) is established by collecting values over all frequency samples and over a certain number of time frames. The estimate is therefore essentially based on a maximum probability and is subject to a certain latency.

Another category of methods referred to as "covariance" methods, sometimes presented as an extension of the first, involves calculating a covariance matrix of spatial components (also sometimes called the Power Spectral Density matrix or "PSD") by frequency sub-bands. Here again, the imaginary part is sometimes completely ignored. It should be noted that the first row (or first column) of this matrix is equivalent to the intensity vector when the spatial components are of the ambisonic type. Many of these approaches involve "subspace" methods as well as algorithms which are sometimes expensive, especially when working on a large number of frequency sub-bands, and when they make use of higher spatial resolutions.

These "vector-based" or "matrix-based" methods seek to discern the "directional" components associated with locatable acoustic sources or paths on the one hand, and with ambient components on the other.

Among the observed limitations of such methods, they are hampered by the interference of the direct sound (which indicates the direction of the acoustic source) with the reflections, even in the case of a single simultaneously active acoustic source. Beyond a certain degree of presence of a room effect, for example, they cannot give a reasonable estimate sufficiently often and/or the estimate is too often biased. When the object comprising the acoustic location determination and capture device (ambisonic microphone for example) is placed for example on a table or near a wall (and/or if this is the case of the acoustic source), such reflective surfaces tend to induce systematic angular bias.

Indeed, location determination is generally biased by the systematic interference of the direct sound with reflections associated with the same acoustic source. When it is based on the velocity vector, it is the real part of the velocity vector which is mainly considered, while the imaginary part is usually ignored (or at least underutilized). Acoustic reflections, considered annoying, are not integrated into the estimation problem. They therefore remain an ignored and unmodeled component, without taking into account the particular interference structures induced.

Thus, for applications of the above type, acoustic location is generally estimated in angular terms only. Moreover, no effective approach seems to propose a distance evaluation based on a single capture point (considered as unique for a coincident or more generally "compact" microphone system, i.e. contained within a volume that is small in size compared to the distances from the acoustic sources, typically around ten centimeters for an ambisonic microphone).

However, some application contexts require additional information on distance from the source in addition to its direction (therefore a 3D location determination in XYZ). These are for example:
- virtual navigation in real environments captured in 3D (because the appropriate modification of the angle and intensity of a source depends on the relative XYZ translation between this object and the microphone),
- locating sources in order to identify the persons speaking (in particular for a connected loudspeaker or other device),
- surveillance, alert devices in residential or industrial environments, or others.

A particularly advantageous approach, presented in document FR1911723, uses the velocity vector of the sound to obtain in particular the direction of arrival of the sound, its delay (therefore the distance to the source), and the delays linked to any reflections, thereby determining the positions of barriers. Such an implementation allows modeling the interference between the direct wave and at least one indirect wave (resulting from reflection), and making use of the manifestations of this model over the entire velocity vector (its imaginary part and its real part).

Nevertheless, this technique, although already being applied, can be the object of further enhancements.

An exemplary embodiment of the invention improves the situation.

SUMMARY

A method for processing audio signals acquired by at least one microphone is proposed, with a view to locating at least one sound source in a space comprising at least one wall, wherein:
- A time-frequency transform is applied to the acquired signals,
- On the basis of the acquired signals, a general velocity vector $V'(f)$ is expressed in the frequency domain, estimated from an expression of a velocity vector $V(f)$ in which a reference component $D(f)$ other than an omnidirectional component $W(f)$ appears in the denominator of said expression, said expression being complex with a real part and an imaginary part, the general velocity vector $V'(f)$ characterizing a composition between:
- a first acoustic path, direct between the source and the microphone, represented by a first vector $U0$, and
- at least a second acoustic path resulting from a reflection on the wall and represented by a second vector $U1$, the second path having, at the microphone, a first delay $TAU1$ relative to the direct path,
- As a function of the delay $TAU1$, the first vector $U0$, and the second vector $U1$, at least one parameter is determined among:
  - a direction (DoA) of the direct path,
  - a distance $d0$ from the source to the microphone,
  - a distance $z0$ from the source to said wall.

The general velocity vector $V'(f)$, mentioned above, is thus constructed from the velocity vector $V(f)$ which is generally expressed as a function of a component in the denominator which is omnidirectional. The general velocity vector $V'(f)$ replaces the "conventional" velocity vector $V(f)$ within the meaning of the aforementioned document FR1911723, then having a "reference" component in the denominator which is other than an omnidirectional component. This reference component can indeed be more "selective" towards the direction of arrival of the sound. In an exemplary embodiment presented further below in particular with reference to FIGS. 6A to 6D and 7, the direction of arrival of the sound enabling calculation of the reference component can be obtained as a first approximation by using the conventional velocity vector $V(f)$ for example during a first iteration of an iterative process gradually converging towards an accurate DoA.

It was then observed within the meaning of the present invention that the determination of the aforementioned parameters DoA, $d0$, $z0$, in particular, is more accurate and/or more precise by using such a general velocity vector $V'(f)$ with a more relevant reference component, instead of the velocity vector $V(f)$. In particular, this method is more robust, especially in situations where a strong sound reflection is due to a barrier placed near the microphone or near an active sound source.

Said parameters DoA, $d0$, $z0$ were cited above. It should be noted that in a typical embodiment, the expression of the general velocity vector also makes it possible to determine in particular the delay $TAU1$ presented above.

In one embodiment, the method can comprise, as indicated above, a plurality of iterations in at least part of which the general velocity vector $V'(f)$ is used, having, in its denominator, a reference component $D(f)$ determined based on an approximation of the direction of the direct path (DoA) obtained in a previous iteration. In most situations, these iterations converge to a more accurate direction DoA.

Such a method can then comprise a first iteration in which the "conventional" velocity vector $V(f)$ is used instead of the general velocity vector $V'(f)$. As described in document FR1911723, the velocity vector $V(f)$ is expressed in the frequency domain while having the omnidirectional component $W(f)$ appear in the denominator. It is then possible to determine, at the end of this first iteration, at least a first approximation of the direction of the direct path (DoA).

Thus, for at least a second iteration subsequent to the first iteration, the general velocity vector $V'(f)$ is used, estimated from an expression of the velocity vector $V(f)$ in which the omnidirectional component $W(f)$ in the denominator is replaced by the reference component $D(f)$, the latter being spatially more selective than the omnidirectional component $W(f)$.

For example, in one embodiment, the reference component $D(f)$ is more selective in a direction corresponding to the aforementioned first approximation of the direction of the direct path (DoA).

The iterations can be repeated until convergence is reached according to a predetermined criterion. In particular, this can be a causality criterion in order to identify with a reasonable degree of certainty at least first sound reflections on obstacles (or "barriers" above) in the sound propagation environment between the microphone and a source.

In one particular embodiment, in each iteration:
- An inverse transform, from frequencies to time, is also applied to said expression of the general velocity vector $V'(f)$ in order to obtain, in the time domain, a succession of peaks each linked to a reflection on at least one wall, in addition to a peak linked to an arrival of sound along said direct path (DoA), and A new iteration is carried out if, in the succession of peaks, a signal appears whose temporal abscissa is less than that of the direct path peak and whose amplitude is greater than a chosen threshold (possibly adaptive), the causality criterion being satisfied if the amplitude of the signal is lower than said threshold.

Obtaining this succession of peaks can typically be linked to the formalism presented in equation Eq.B4=39b given in the Annex, and described further below with reference to FIG. 2, but here of course applied to the general velocity vector V'(f).

The aforementioned iterations of the method can be terminated, for example:

in a first case where the amplitude of the aforementioned signal is lower than the chosen threshold, and in a second case where repetition of the iterations does not lead to a significant reduction in the amplitude of this signal.

In one exemplary embodiment, the second case is followed by implementing the following steps, the acquired signals being delivered in the form of successive frames of samples:

For each frame, a score for the presence of sound onset in the frame is estimated (in accordance for example with an equation such as Eq.53 in the annex), and The frames with scores higher than a threshold are selected for processing the audio signals acquired in the selected frames.

Indeed, if convergence towards a DoA solution is not easy due to the proximity of barriers causing immediate first sound reflections, it may be preferable to look for the immediate reaction of these barriers to sound onset (when emission of a sound begins).

Concerning the respective expressions of the "conventional" and "general" velocity vectors and in an embodiment where the acquired signals are picked up by an ambisonic microphone, the "conventional" velocity vector V(f) can be expressed in the frequency domain by first-order ambisonic components in a form of the type:

$$V(f)=1/W(f)[X(f),Y(f),Z(f)]^T,$$

W(f) being the omnidirectional component,
while the general velocity vector V'(f), expressed in the frequency domain by first-order ambisonic components, is presented in a form of the type:

$$V(f)=1/D(f)[X(f),Y(f),Z(f)]^T,$$

D(f) being the aforementioned reference component which is other than the omnidirectional component.

The order considered here is first order, which allows expressing the components of the velocity vector in a three-dimensional frame of reference, but other implementations are possible, in particular with a higher ambisonic order.

In one embodiment, an estimate of the direction of the direct path, which is equivalent to the first vector U0, can be determined from an average over a set of frequencies of the real part of the general velocity vector V'(f) expressed in the frequency domain (in accordance with the formalism of equation Eq.24 applied here of course to the general velocity vector V'(f)).

Thus, already the expression of the velocity vector in the frequency domain makes it possible to provide an estimate of vector U0.

In a more advanced embodiment, however:

An inverse transform, from frequencies to time, is applied to the general velocity vector in order to express it in the time domain V'(t), At least one maximum is searched for in the expression of the general velocity vector V'(t)max as a function of time, after a duration of the direct path, and The first delay TAU1, corresponding to the time giving the maximum V'(t)max, is deduced therefrom.

Furthermore, in this embodiment one can then:

estimate the second vector U1 as a function of values of the normalized velocity vector V' which are recorded at time indices t=0, TAU1, and 2×TAU1, to define a vector V1 such that:

$$V1=V'(TAU1)-((V'(TAU1)\cdot V'(2\cdot TAU1))/\|V'(TAU1)\|^2)V'(0),$$

vector U1 then being given by: U1=V1/‖V1‖.

Then:

It is possible to determine respective angles PHI0 and PHI1 of the first vector U0 and of the second vector U1, with respect to said wall, such that:

PHI0=arcsin(U0·nR) and PHI1=arcsin(U1·nR), where nR is a unit vector and normal to the wall, and The distance d0 between the source and the microphone can be determined as a function of the first delay TAU1 by a relation of the type:

d0=(TAU1×C)/((cos PHI0/cos PHI1)−1), where C is the speed of sound.

In addition, the distance z0 from the source to said wall can then be determined by a relation of the type:

$$z0=d0(\sin PHI0-\sin PHI1)/2.$$

We can thus determine all the parameters relevant to the location of the source (of FIG. 1 for example), here in the case where a single wall is present, but this model can be generalized to the presence of several walls.

Thus, in an embodiment where the space comprises a plurality of walls:

An inverse transform, from frequencies to time, is applied to the general velocity vector in order to express it in the time domain V'(t) in the form of a succession of peaks (formalism corresponding in a first approach to equation Eq.39b of the annex), In the succession of peaks, peaks linked to a reflection on a wall among said plurality of walls are identified, each identified peak having a temporal abscissa that is a function of a first delay TAUn of the acoustic path resulting from the reflection on the corresponding wall n, relative to the direct path, As a function of each first delay TAUn, of the first vector U0, and of each second vector Un representing an acoustic path resulting from a reflection on a wall n, at least one parameter is determined among:

the direction (DoA) of the direct path, the distance d0 from the source to the microphone, and at least one distance zn from the source to the wall n.

As can be seen in FIG. 5B, which is an example applied to the "conventional" velocity vector but which can be adapted to the general velocity vector, the expression of the velocity vector (conventional as well as general), after inverse transform (frequencies to time), presents a succession of peaks, which is also illustrated in FIG. 2 for didactic purposes, where maxima are reached for multiple values of the aforementioned delays (TAU1, 2TAU1, etc.; TAU2, 2TAU2, etc.) between the direct path and the paths resulting from at least one reflection on a wall, as well as for combinations of these delays (TAU1+TAU2, 2TAU1+TAU2, TAU1+2TAU2, etc.).

These peaks can then be utilized to identify in particular the peaks linked at least to a reflection on a wall n and which therefore have multiple temporal abscissas (x1, x2, x3, etc.) for the delay TAUn associated with this wall n.

As the combinations of different delays can complicate the identification of simple delays (TAU1, TAU2, TAU3, etc.) and the presence of associated walls, a first portion of peaks having the smallest positive temporal abscissas can be preselected in order to identify, in this portion, the peaks each associated with a reflection on a wall (without thus having the combination of different delays TAU1+TAU2, 2TAU1+TAU2, TAU1+2TAU2, etc. which can appear after the first peaks). Such an implementation assumes, however, that the aforementioned causality criterion is reached (otherwise "secondary" peaks can also be obtained by combinations of delays with negative multipliers, so that their combinations with "positive" delays can end up with small positive temporal abscissas).

Thus, in the case of an ideal situation where the peaks linked to a reflection on a wall n possibly have temporal abscissas that are multiples of the delay TAUn associated with this wall n, it is possible to preselect a first portion of peaks having the smallest positive temporal abscissas, in order to identify the peaks in this portion that are each associated with a single reflection on a wall.

In the embodiment where the signals acquired by the microphone are in the form of a succession of samples, it is more generally possible to apply to these samples a weighting window with decreasing exponential variation over time (as will be seen further below with reference to FIG. 5A).

It is possible that in addition, this window can be placed at the very start of the sound onset (or even just before the sound onset). This avoids the difficulty of multiple reflections.

The application of such a weighting window makes it possible to obtain a less biased first estimate of the parameters U0, d0, etc. resulting from utilizing the expression of the velocity vector in the time domain, in particular when the "conventional" velocity vector is concerned, for example within the context of a first iteration of the method. Indeed, in certain situations where the cumulative magnitude of the reflections is greater than that of the direct sound, the estimation of the aforementioned parameters can be biased. These situations can be detected when peaks are observed at negative temporal abscissas (curve at the top of FIG. 5B) in the temporal expression of the velocity vector. The application of a weighting window of the aforementioned type allows returning these peaks to positive abscissas as illustrated by the bottom curve of FIG. 5B, and providing less biased estimates.

It should nevertheless be noted that this implementation is optional insofar as the use of the general velocity vector instead of the "conventional" velocity vector already allows a nearly unbiased estimation of the parameters U0, d0, etc., including in this type of situation. Nevertheless, such processing can take place for example for a first iteration of the method using the "conventional" velocity vector or even in the second case, mentioned above, of non-convergence of the iterative processing.

In one embodiment, a weighting q(f) may further be applied iteratively, each associated with a frequency band f, to the velocity vector (general or conventional) in the frequency domain, according to an expression of the type:

$$q(f) = \exp(-|Im(V(f)) \cdot m|/(\|Im(V(f))\|)),$$

where Im(V(f)) is the imaginary part of the velocity vector (conventional or general, and here denoted simply as "V(f)"), and m is a unit vector normal to the plane defined by vector U0 and a normal to the wall (typically the Z axis of FIG. 1 commented on in detail further below).

Such an embodiment makes it possible to select the most usable frequency bands for determining the aforementioned parameters.

This invention also relates to a device for processing audio signals, comprising a processing circuit arranged to implement the above method.

By way of illustration, FIG. 4 schematically shows such a processing circuit which can then include:
- an input interface IN for receiving signals SIG acquired by the microphone (which may include several piezoelectric plates to compose these signals, for example in an ambisonic context),
- a processor PROC cooperating with a working memory MEM to process these signals in particular to develop the expression of the general velocity vector in order to derive the desired parameters d0, U0, etc., whose values can be delivered by the output interface OUT.

Such a device can take the form of a module for locating a sound source in a 3D environment, this module being connected to a microphone (acoustic antenna or some other type). Conversely, it can be an engine that renders sound based on a given position of a source in a virtual space (containing one or more walls) in augmented reality.

This invention also relates to a computer program comprising instructions for implementing the above method, when these instructions are executed by a processor of a processing circuit.

For example, FIGS. 3A, 3B, and 7 illustrate an example of a possible flowchart for the algorithm of such a program.

According to another aspect, a non-transitory computer-readable storage medium is provided on which such a program is stored.

In the detailed description that follows, the general velocity vector and the "conventional" general vector are designated without distinction by the same term "velocity vector", with the same V notation (V(f); V(t)) in particular in the equations presented in the Annex. When it specifically concerns the general velocity vector, the vector is explicitly designated by that term and is denoted V' (V'(f); V'(t)). In the first part of the description up to FIG. 5B, the principles underlying the formalism used in document FR1911723 and included here in the equations given in the Annex are recalled.

BRIEF DESCRIPTION OF THE DRAWINGS

More generally, other features, details, and advantages will become apparent upon reading the detailed description below, and upon analyzing the appended drawings, in which:

FIG. 5B compares a temporal expression after IDFT of the velocity vector:
without prior processing of the samples by the weighting window (top curve),
and with processing by the window (bottom curve).

DETAILED DESCRIPTION OF ILLUSTRATIVE EMBODIMENTS

Figure 1:
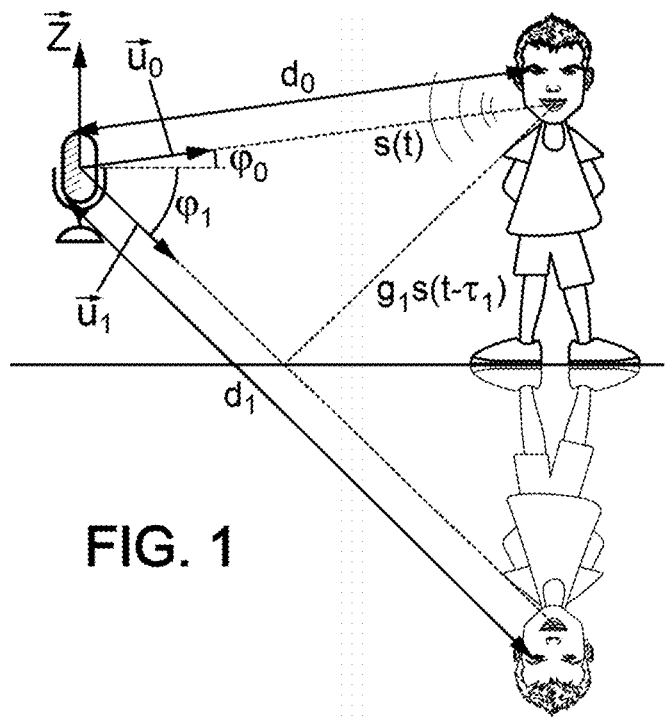
FIG. 1 shows, by way of illustration, various parameters involved in locating a sound source according to one embodiment.

The velocity vector can be calculated in a manner that is known per se. However, some specific parameter settings can be recommended to improve the final results obtained.

Usually, frequency spectra B(f) of ambisonic signals are typically first obtained by Short Term Fourier Transform (or STFT) for a succession of time frames b(t), generally overlapping (with overlap/add for example). Here, the order of the ambisonic components can be m=1 for four components (without loss of generality however, the calculations being adaptable to higher orders).

Then, for each of the temporal frames, a velocity vector is next calculated for all of the frequency samples as a ratio of the directional components X(f), Y(f), and Z(f):
to the omnidirectional component W(f) (equation Eq.6 of the ANNEX), for the conventional velocity vector, or
to a reference component D(f), for the general velocity vector, D(f) replacing W(f) in equation Eq.6 of the ANNEX.

It is possible to envisage embodiments which also introduce temporal smoothing or consolidation by weighted sum, as described below.

With such a ratio (X(f)/W(f), Y(f)/W(f), Z(f)/W(f); X(f)/D(f), Y(f)/D(f), Z(f)/D(f)), the characteristic of the source signal is substantially removed so as to highlight the characteristics of the acoustic channel, if indeed the spectral composition of the audio signal excites a substantial amount of useful frequencies (for example over a wide frequency band).

In the applications presented above, we can consider the situation of an acoustic source with stable characteristics (in position and in radiation, at least over several consecutive frames) emitting a signal s(t), in a stable acoustic environment (reflective walls and objects, possibly diffracting, etc., therefore responsible for what is usually referred to as "room effect" even if not in an actual "room"). These signals are picked up by an ambisonic microphone. The ambisonic signals b(t) result from the combined spatial encoding of different versions of the signal s(t) along its direct and indirect paths, the so-called "acoustic channel effect". This results in convolution of the signal by a spatial impulse response h(t) in which each channel (or dimension) is associated with an ambisonic component, as expressed in equation Eq.8 of the ANNEX.

This impulse response is called SRIR for "Spatial Room Impulse Response" and is generally represented as a series of temporal peaks:
the first peak, located at time t=TAU0 (propagation time), corresponding to the direct sound,
the second peak, at t=TAU1, corresponds to a first reflection, etc.

Thus we must be able to read in these peaks the direction of arrival of these wave fronts, with, in a first approximation, the expression of vector $u_n$ given in equation Eq.9-1. In practice, the spatial impulse response is unknown data, but we set forth here how to arrive indirectly at some of its characteristics, through the velocity vector, calculated on the basis of the ambisonic signal b(t).

To highlight this, we first describe the link between the impulse response h(t), the transmitted signal s(t), and the ambisonic signals b(t) (Eq.9-2) over a selected observed time interval. To be exact, this expression assumes the absence of any measurement noise and of other acoustic sources whose signal would be picked up directly or indirectly over the time interval considered. The entire direct and indirect signal of the source is therefore captured over this time interval.

We show that by performing a Fourier Transform on this entire time interval, the resulting velocity vector is uniquely characteristic of the spatial impulse response. This so-called LT transform (because it is "longer term" than an STFT) converts b(t), s(t), and h(t) into B(f), S(f), and H(f) according to equation Eq.10. This temporal support can correspond to a temporal window extending over several consecutive signal frames.

The expression for the velocity vector calculated in Eq.11 is then deduced from the expression of the convolution calculated in the frequency domain. This expression Eq.11 becomes characteristic of the acoustic channel (in other words, of the room effect) and no longer of the transmitted signal, provided that it has non-zero energy (in practice, detectable) for each frequency f over the time period considered.

In practice and as has been mentioned, a frequent approach is to carry out a time-frequency analysis per frame, where each Short-Term Fourier Transform is applied to a temporal windowing which in principle does not verify that the observed signal results entirely and solely from a convolution product of equation Eq.9. This means that, in the strict sense, the velocity vector cannot be written in a form which only characterizes the acoustic channel (as in the right side of equation Eq.11). However, here the approximation is made as much as possible (equation Eq.20 introduced below) in the context of this description, while exploiting the advantages of the short-term analysis presented below.

In subsequent steps, we look for a succession of energy peaks which characterize the direct path of the signal emitted from the source and received by the microphone, then the first reflections on one or more walls, as long as these reflections are identifiable. We can then concentrate on what is characteristic of the beginning of the spatial impulse response, namely firstly the first temporal peak, from which the direction of the direct sound is deduced, and possibly the following temporal peaks which are characteristic of the first reflections.

To do this, we inspect the effect of an interference between the direct sound and at least one reflection, on the expression of the complex velocity vector, so as to estimate the relevant parameters for defining the position of the sound source.

We introduce a simplified model of a direct path (n=0) combined with N specular reflections (n=1, . . . , N) for the beginning of the impulse response as presented in Eq.12, where $g_n$, $TAU_n$, and $u_n$ are respectively the attenuation, the delay, and the direction of arrival of the wave of index n (nth reflection) reaching the microphone system. In the following, for simplification but with no limitations on the generality, we consider delays and attenuation relative to the direct sound, which amounts to setting the terms of equation Eq.13 for n=0.

The corresponding frequency expression is given in equation Eq.14, with the particular case of $gamma_0=1$ for the direct sound. Of course, the variable gammas, for any n greater than 0, is a function of the frequency f.

It follows that the frequency expression of the ambisonic field, if we neglect the later part, is given by expression Eq.16.

The short-term velocity vector is then expressed by equation Eq.17, or by equation Eq.18 in a regularized version with a non-zero EPSILON term so as to avoid (nearly) infinite values when the component in the denominator is (almost) zero. In equation Eq.17 or Eq.18, the component W (specific to the conventional velocity vector) can be replaced by the reference component D in order to express the general velocity vector.

In actual fact, in the general case D replaces W in the denominator, the expression of the conventional velocity vector V corresponding to the particular case where D=W. However, for the convenience of the presentation here, notations relating to the particular case where D=W are presented in the first equations of the annex, given for the conventional velocity vector but easily transposable to the general velocity vector by keeping in mind that D replaces W.

The short-term analysis makes it possible to observe, over time and according to the dynamic evolution of the source signal, frequency fingerprints (denoted "FDVV" below) which are characteristic of submixes of wavefronts within the spatial impulse response. A characteristic submix (smx for "submix"), for a given observation, is modeled according to Eq.19, in the time and frequency domains.

In the approach described below, we endeavor to characterize the frequency fingerprint FDVV as resulting from an implicit model of submix $H^{smx}$ by the approximation expressed in Eq.20 (which in general is not an exact equality except in special situations). The expression in equation Eq.20 is given here in practice for the conventional velocity vector and can be adapted for the general velocity vector by replacing H_W by matrixing vector H by a matrix $D_\theta$ described below.

In particular at signal onset times, the implicit model $h^{smx}$(t) plausibly resembles the beginning of the spatial impulse response $h^{early}$(t) at least in terms of relative wavefront directions and delays. As the implicit relative gain parameters $g_n$ are impacted by the temporal windowing and the dynamic characteristics of the signal, they do not necessarily appear as conforming to those of the impulse response. Focusing here primarily on the direct wave (which provides the DoA) and one or several early reflections, the situations where the observation is characteristic are primarily considered.

For illustrative purposes in particular, an example is presented below of a processing which only takes into account one reflection with estimation of the conventional velocity vector in the frequency domain, the case of the general velocity vector being presented later on. We discuss here the case of a simple interference (essentially between the direct sound and a first reflection), and we show how to determine the desired parameters by highlighting a particular spatio-frequency structure, looking not only at the real part but also the imaginary part of the velocity vector. Indeed, the ambisonic field is written according to Eq.21, and from this we deduce the velocity vector according to Eq.22. It follows from this expression that the real and imaginary parts travel parallel segments in 3D space (respectively affine and linear) when the frequencies travel the audio spectrum concerned as presented in Eq.23. The affine segment (real part) is on a line containing unit vectors U0 and U1 pointing to the direct and indirect waves respectively, and the two segments are orthogonal to the mid-plane of these two vectors (and thus the imaginary part of the vector still is itself since it is on the linear segment). Furthermore, assuming a homogeneous distribution of phase differences between the waves (therefore a representative sweep of the frequencies), according to a statistical calculation, the average of the real part of the velocity vector is equal to vector U0 as expressed in Eq.24 and the maximum probability is an average of U0 and U1 weighted by the respective amplitude of the waves as expressed in Eq.25. DoA detections based on maximum probability are therefore marred by a systematic angular bias, giving an intermediate direction between the direct sound and its direction. Equations Eq.23 show that this spatial sweep is done with a frequency periodicity equal to the inverse of delay TAU1 between the two waves. It is therefore possible to extract directions U0 and U1 as well as delay TAU1 from the observations, when such spatio-frequency structures can be observed. Another way of estimating these parameters in the time domain is presented further below (description in relation to FIG. 2).

By having a preconception on the orientation of the reflective surface in relation to the reference system of the microphone, we can then deduce, from the estimation of U0, U1, TAU1, the information on the absolute distance d of the source relative to the microphone, and possibly the altitude of both. Indeed, by denoting as d0 the distance from the source S0 to the microphone M, and d1 that of its mirror image S1 relative to the reflection surface R as illustrated in FIG. 1, the surface R is orthogonal to the plane formed by vectors U0 and U1. The three points (M,S0,S1) are in a same plane orthogonal to the surface R. It still remains to define a parameter to be determined in order to define the orientation (or inclination) of the plane of reflection. In the case of a reflection by the floor or ceiling (thus detected because U1 points towards the floor or the ceiling), one can exploit the assumption that this is horizontal and parallel to the X-Y plane of the frame of reference of the ambisonic microphone. Then the distances d0 and d1 are linked by the relation Eq.26, which moreover directly gives the distance from the microphone M to the axis (S0,S1), PHI0 and PHI1 being the respective elevation angles of vectors U0 and U1.

We also have an estimate of the delay TAU1 of the reflected sound relative to the direct sound, which provides access to another relation Eq.27 between the distances, since their difference shows the acoustic path delay, with a factor c which is the speed of sound.

By expressing d1 as a function of d0, this last quantity becomes the only unknown, which can be estimated according to Eq.28. We also obtain the distance from the source to the plane of reflection, i.e. its height or altitude z0 relative to the ground according to Eq.29, as well as that of the microphone in Eq.30.

The various parameters U0, U1, PHI0, PHI1, d1, d0, etc. are illustrated in FIG. 1 in the example of a reflection on a floor. Of course, similar parameters can be deduced for a reflection on a ceiling. In the same manner, similar parameters can be deduced for a reflection on any other reflection surface R whose orientation in relation to the frame of reference of the microphone is known, an orientation which is characterized by the normal nR (unit vector orthogonal to the surface R). It is sufficient to redefine angles PHI0 and PHI1 with respect to the reflecting surface R, generally as PHI0=arcsin(U0·nR) and PHI1=arcsin(U1·nR). It is thus possible to determine, by the vector U1 associated with each reflection case, the respective positions of these obstacles, for applications of augmented reality or in robotics for estimating location by acoustic detection.

In cases where the orientation nR of the reflecting surface is not known initially, it is possible to estimate it completely if one has estimates, via observations at different times, of the wavefront parameters associated with at least two source positions for which a reflection by this same reflection plane is detected. We thus have a first set of parameters (U0, U1, TAU1) and at least a second (U0', U1', TAU1'). As U0 and U1 define a plane orthogonal to plane R, their vector product defines an axis of this plane R, and the same applies to a vector product drawn from U0' and U'1.

These respective vector products (non-collinear) together define the orientation of the plane R.

However, one limitation of the model with only two interfering waves (a direct sound and a reflected wave) is that it can be difficult to discriminate the various first reflections on the barriers. Moreover, the spatio-frequency behavior of the velocity vector quickly becomes more complex when additional reflections are introduced.

Indeed, the paths of the real and imaginary parts then combine, and in a non-trivial manner, along several axes:
in parallel planes for a direct wave and two reflections, or in the entire space in general.

These complex spatio-frequency distributions make it too cumbersome to determine the parameters of the model when several reflection surfaces are to be considered.

One solution to this problem is to perform a time-frequency analysis that is more temporally selective (i.e. with shorter temporal windows) in order to have the chance of spotting the appearance of a simpler acoustic mix during onsets of some amplitude (transient, rising signal), i.e. reducing the number of reflections interfering with the direct sound in the mix present in the frame in question. However, in some situations, the delays associated with successive reflections may be too close together to allow isolating the effect of the first reflection in its interference with the direct sound.

Processing is therefore proposed below that makes it possible to easily separate the effects of multiple interferences and to characterize them. A first step consists of converting the fingerprint of the velocity vector into the time domain (or "TDVV" for "Time-Domain Velocity Vector"), by means of an Inverse Fourier Transform as presented in Eq.31. This has the effect of condensing the effects of frequency cyclicity associated with certain axes and which manifest as complex peregrinations of the velocity vector, into more sparse data and therefore more easily analyzable. Indeed, such a conversion causes series of peaks to appear at regular time intervals, in which the most significant peaks are easily detectable and extractable (see for example FIG.

One remarkable property is that by construction (due to the inverse Fourier Transform), the vector at t=0 is equal to the average of the velocity vector in the frequency domain (average of its real part if we only consider the half-spectrum of positive frequencies). Such an observation is relevant for estimating the main DoA U0.

Starting from the frequency model of the velocity vector for two interference waves (direct sound and a reflection), we can usefully reformulate the denominator by means of the Taylor expansion of Eq.32. With the conditions on x and on gamma1 given in Eq.32, we arrive at the expression Eq.33 of the (conventional) velocity vector, and under the condition that the reflection is of lesser amplitude than the direct sound (g1<g0=1, which is generally the case when sound onset begins), the inverse Fourier transform of this expression converges and is formulated as expressed in equation Eq.34, where a first peak is identified at t=0 which gives U0 (the direction of the direct sound), then a series of peaks characteristic of the reflection's interference with the direct sound.

Figure 2:
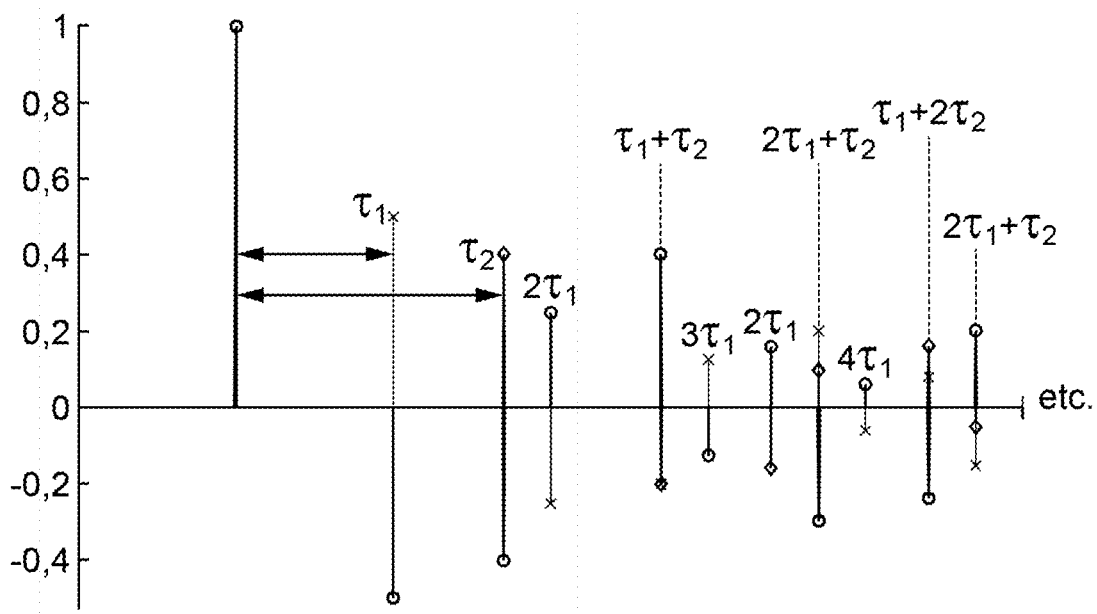
FIG. 2 shows, by way of illustration, the various successive peaks exhibited by the temporal expression of a velocity vector after its inverse transform from frequency to time ("IDFT").

These peaks are placed at multiple times t=kTAU1 (non-zero integers k>0) of the delay TAU1, and are of exponentially decreasing amplitude in norm (according to gain g1). By using the conventional velocity vector, they are all associated with directions collinear with the difference U0−U1, therefore orthogonal to the mid-plane between these two vectors, and of alternating direction (sign). The advantage of having converted the velocity vector into the time domain is the sparse and almost immediate presentation of the desired parameters (FIG. 2).

It is thus possible to determine, in addition to the main DoA U0:
the delay TAU1, possibly for several distinct walls,
then a vector collinear with U0−U1 which is normalized to a unit vector n, which can be used, with equation Eq.41 for example (given for the conventional velocity vector), for
deducing U1 as being the symmetrical to U0 relative to their mid-plane, and
optionally, the attenuation parameter g1 (this being able to be modified by the time-frequency analysis parameters, in particular by the shape of an analysis window and by its temporal placement relative to the acoustic events observed. Estimation of this parameter is therefore of less utility in the application contexts considered here).

Observation of the following temporal peaks makes it possible to check whether they are substantially consistent with the same series (multiple delays TAU1, multiple delays TAU2, etc.) and therefore characteristic of the same interference, otherwise it being necessary for example to determine the presence of multiple reflections.

We distinguish below a case with "favorable conditions" where, in the case of N reflections, we apply the Taylor expansion to give the conventional velocity vector according to Eq.35, provided that the sum over N of the gammas in equation Eq.35 remains less than 1. The Taylor series, which translates the denominator in the initial expression, can be rewritten using the multinomial law of equation Eq.36, which makes it possible to reorganize the expression of the conventional velocity vector V model as a sum of several series, with "cross series" represented by the term SC in Eq.37. For the general velocity vector V', we find a slightly different equation in equation Eq.B2 at the end of the Annex, this equation also being denoted Eq.35b because it corresponds to equation Eq.35 but given here for the general velocity vector. Moreover, at the end of the Annex are given the equations specific to the general velocity vector V', and the correspondence to a previously written equation specific to the conventional velocity vector is indicated by a "b" after the equation number (Eq.xxb).

Under condition Eq.38 for the conventional velocity vector and any frequency f (equation Eq.B3=38b for the general velocity vector), we deduce by inverse Fourier transform the following time series Eq.39 (equation Eq.B4=39b for the general velocity vector), with series having combined delays SARC. We identify a first peak at t=0 which gives U0 (the direction of the direct sound), then for each reflection a series of peaks characteristic of the interference of this reflection with the direct sound. In FIG. 2 for example, these peaks are placed at successive positive temporal abscissas TAU, 2TAU, 3TAU, etc., which are multiples of the delay TAU between the reflection on a wall and the direct path.

Series characteristic of interferences between several reflections on several walls and the direct sound then appear (for larger temporal abscissas), in which the delays are other combinations (with positive integer factors) of their various delays.

Indeed, FIG. 2 illustrates such a series in the simplified case of two reflections interfering with a direct sound. Each marker (respectively round, cross, diamond) indicates by its ordinate the contribution of the vectors U0, U1, U2 (characteristic of the direct sound, of a first reflection, and of a second reflection respectively) to the temporal fingerprint TDVV as a function of the temporal abscissas. We can thus see that the reception of the direct sound is characterized by the first peak at time zero and of amplitude 1, illustrated by a circle. The interference of a first reflection (delay TAU1) with the direct path causes a first series of peaks at TAU1, 2×TAU1, 3×TAU1, etc., which are marked here by a cross at one end and a circle at the other end (top-bottom). The interference of a second reflection (delay TAU2) with the direct path causes a second series of peaks at TAU2, 2×TAU2, 3×TAU2, etc., marked here by a diamond at one end and a circle at the other end. Then comes an element of the "cross series", i.e. the interference between the reflections (first delay: TAU1+TAU2, then 2TAU1+TAU2, then TAU1+2TAU2, etc.). These cross series, whose expression is accessible but long to write in a general case, are not explicitly described here for the sake of brevity, especially since they do not need to be utilized for estimating the relevant parameters in the processing presented here.

We describe below the analysis of the temporal fingerprint by sequential estimation of parameters.

Estimation of model parameters based on a calculated time series is done in a manner similar to the case of a single reflection as previously described. We first place ourselves in the most general situation (excluding particular cases dealt with later on), corresponding to a favorable case where the delays do not "overlap": the series described above then do not see any temporal coincidence, i.e. any identifiable peak belongs to only one of them. Therefore by noting the temporal peaks via an increasing delay from t=0, any detected new peak, having a delay TAUnew, can either be attributed to a series already identified, or can define the start of a new series. Indeed, taking into account a set of delays characteristic of reflections already identified, the first case is detected if there integers k that are positive or, in part, zero, yielding TAUnew according to Eq.40, otherwise we fall into the second case and the set of identified reflections is increased by introducing the new delay TAUN+1, associated with a direction which can be estimated in the manner described for the case of a single reflection.

In practice, it may not be necessary to try to explain numerous temporal peaks. We limit ourselves to the first peaks observed, especially since they are the most easily detectable due to their greater amplitudes (or magnitudes, in absolute value) than the following ones. Thus, situations where delays have common multiples but are of high rank Ki; Kj (or not low) can be analyzed as a function of amplitude, by the above processing.

As long as the sum of the moduli of the implicit gains gn (n>0) is less than 1 (Eq.38 for the conventional velocity vector), the inverse Fourier transform (Eq.31) gives a unidirectional temporal fingerprint which develops over positive times.

Figure 5A:
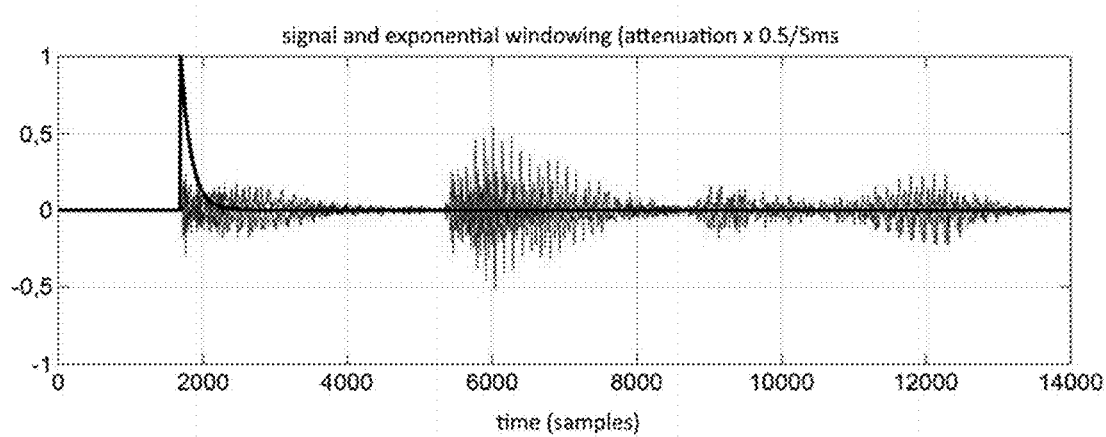
FIG. 5A shows a weighting window for the samples of the acquired signals, exponentially decreasing over time, according to one embodiment.

If, on the other hand, the sum of the moduli of the implicit gains gn (n>0) is greater than 1, the inverse Fourier transform gives a "bidirectional" temporal fingerprint TDVV, with series generally developing both towards positive times and towards negative times (top curve in FIG. 5B for illustrative purposes). Such a situation in which one or more reflection gains would be greater than 1 can be encountered, for example, when the direct wave has an amplitude that is less than the sum of the amplitudes of the waves resulting from reflections on one or more barriers. In this "unfavorable case", the main peak at time zero no longer corresponds strictly to vector u0, but to a mixture of the latter with a more or less significant proportion of the vectors designating the directions of the reflections. This leads to location bias (in the 'estimated DoA'). Another symptom is that the main peak then has a norm different from 1 in general, and more often less than 1.

The invention proposes a robust method, particularly in this type of situation. It proposes adjusting the expression of the velocity vector by giving spatial selectivity towards the DoA in the D component which appears in its denominator instead of the usual omnidirectional component W.

By giving a directivity approach in the reference component D, the relative attenuation associated with each reflection of index n is assigned to the denominator by a factor BETAn, at the same time as an overall factor NU0 is calculated (equation Eq.B1 of the Annex), which leads to an expression of the general velocity vector given by equation Eq.B2=35b for a model with N reflections, as introduced above for the case of the general velocity vector. Note that the condition for a Taylor series expansion, as presented in the right-hand side of the equation, is now given by equation Eq.B3=38b. It is understood that due to the additional attenuation factors BETAn, this condition is more easily satisfied in more situations. Recall that an indicator of compliance with this condition and with the resulting model is the causal nature of the overall time series. Under this condition satisfied for all the frequencies, the general velocity vector model in the time domain is then identified in the form of equation Eq.B4=39b which shows (in a manner similar to the case of the conventional velocity vector, in equation Eq.39):

- a first peak at t=0, therefore the direction gives the DoA, the vector U0 being obtained by normalizing equation Eq.B5,
- as many time series as there are reflections, each associated with the interference between a reflection and the direct sound, and for which the value of the vectors observed at regular intervals TAUn, is reported in equation Eq.B6,
- and series with combined delays, denoted SARC, which are not used in the estimation procedure which follows.

Starting from equation Eq.B6 at the end of the Annex, we retain a particular relationship between two successive vectors of a series, in particular between the first two vectors V'(TAUn) and V'(2·TAUn), which are the most prominent. Equation Eq.B7 thus shows a factor (−Gn/BETAn) here denoted "RHO" and whose equation Eq.B8 provides an estimate as a scalar product of the first two aforementioned vectors of the same series V'(TAUn) and V'(2·TAUn), this scalar product being divided by the squared norm of the first. By reintegrating the RHO factor into equation Eq.B6, the obtained equation Eq.B9 can be rearranged to give equation Eq.B10. The right side of this equation shows vector Un (in particular, vector U1 if we focus on the first reflection and its associated series), affected by a factor NU0/Gn which is positive (except in presumably rare situations such as a reflection with phase inversion): it can therefore be obtained by normalizing the left side V'(TAUn)−RHO·V'(0).

Furthermore, the overall factor NU0 is likely to integrate other influencing factors than the reference directivity, for example an overall reduction in amplitude which could be caused by a limitation of the frequency bandwidth of the signal source, and/or its partial masking by noise (although the latter effect is generally more complex to model). It is interesting to note that ultimately, the direction of vector U1 (or more generally Un) can be estimated in the same manner, and for any cause of this overall reduction in amplitude NU0.

It should also be noted that this mode of estimation also applies to the conventional velocity vector (in which case it is simply necessary to consider BETAn=1).

A description is given below of one practical example of an embodiment using the general velocity vector to determine parameters such as the DoA in particular.

In this embodiment, described here by way of illustration with reference to FIGS. 6A to 6D, and 7, a first estimation of the delays (step S71 of FIG. 7) is carried out with the conventional velocity vector, calculated "normally":

$$V(f)=1/W(f)[X(f),Y(f),Z(f)]T$$

here for example on first-order ambisonic components.

In step S721, calculations as presented above are carried out based on the frequency expression of the conventional velocity vector V(f), until the estimation of the temporal expression of the conventional velocity vector V(t).

In step S731, analysis of the temporal expression of the conventional velocity vector V(t) is carried out as a time series of peaks. In this analysis, we determine in particular whether it is possible to identify it effectively (with minor interferences) with a unidirectional time series developing only in positive times (as a true "causal response"), as described by equations Eq.39 and Eq.40 of the Annex.

Figure 6A:
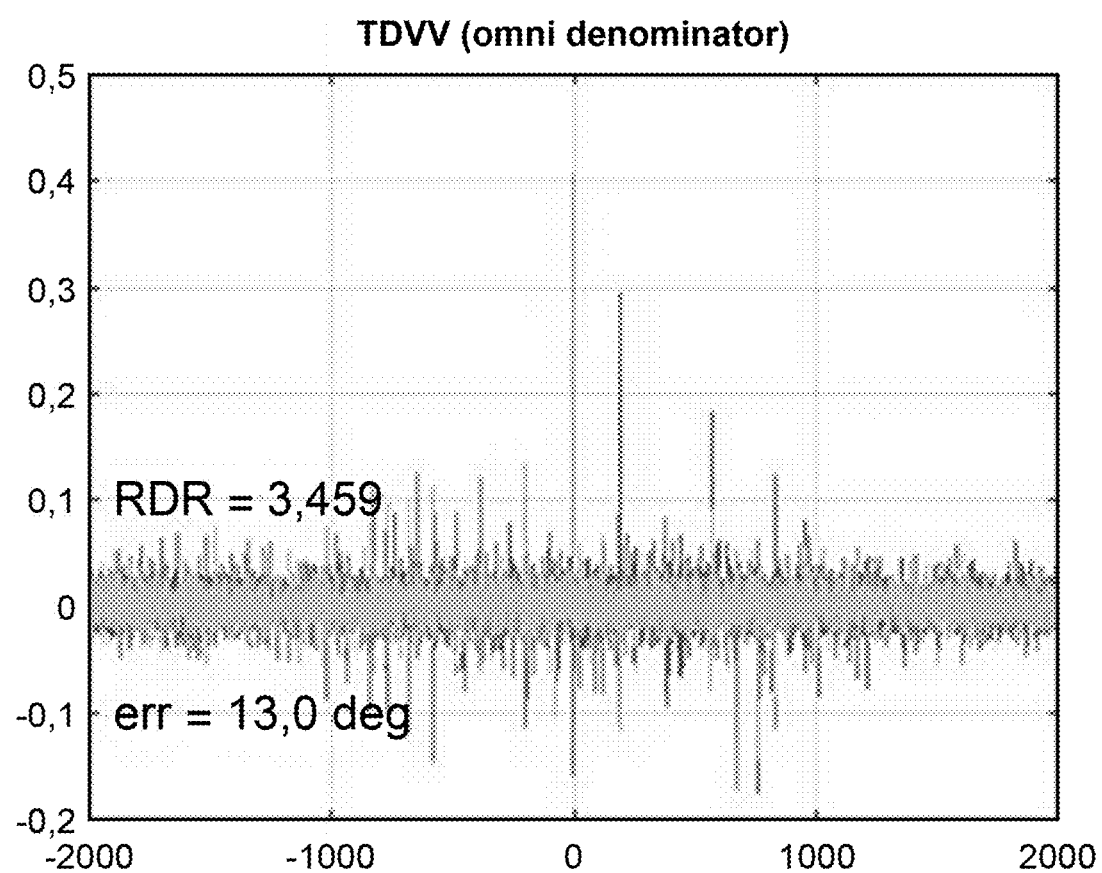
FIGS. 6A, 6B, and 6C represent the general look of the related peaks present in the temporal expression of the general velocity vector V'(t), as iterations of the method described below with reference to FIG. 7 are repeated.
Figure 6B:
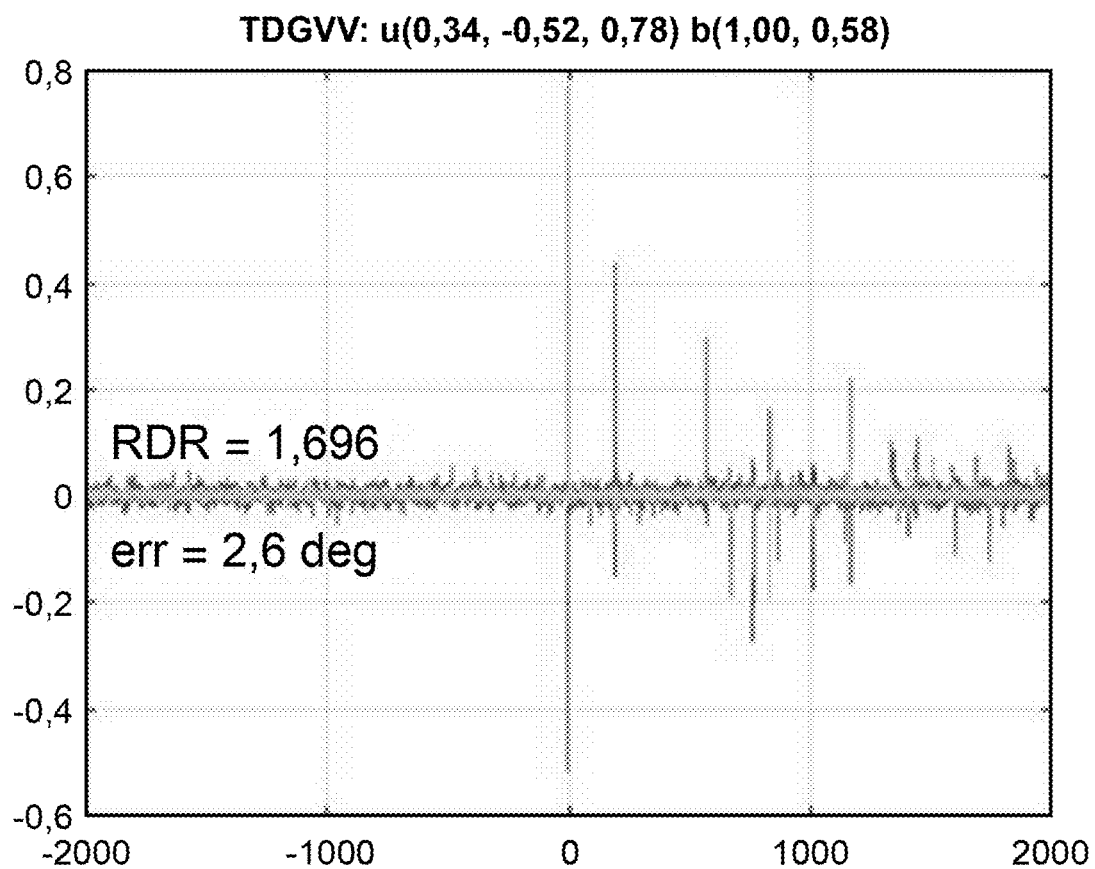

If, in the analysis of the expression of the conventional velocity vector V(t) in the time domain, we find peak structures in negative times (for example higher in energy or in amplitude than a chosen threshold THR), typically such as the peaks present on the negative abscissa of FIG. 6A, then this means that it cannot reasonably be identified in equation Eq.39 and therefore that the estimate of the DoA given by peak V(t=0) is biased. Moreover, this is symptomatic of the fact that the convergence condition of the Taylor series leading to equation Eq.39 is not fulfilled, and therefore of the fact that the quantity of indirect waves mixed in with the direct sound in the denominator of the V(f) calculation, is proportionally too large. In the improvement proposed here, this proportion of indirect waves is reduced by spatial filtering. This means that it is necessary to improve a directivity (the one in play in the denominator) in the estimation of the velocity vector V(f).

Spatial filtering is then applied to the ambisonic data in order to form a beam in the direction (DoA) obtained in step S751 as V(t=0) from the velocity vector obtained previously (step S71). Indeed, while probably being erroneous, this first estimate is able to provide an approximation that is admittedly rough but is sufficient to orient this beam towards the origin of the direct sound and to attenuate the reflections coming from more distant angular sectors.

A modified velocity vector V'(f), then V'(t) in the time domain (step S781) are calculated, based on these filtered ambisonic data.

In test S732, it is determined whether there are still temporal abscissa peaks of less than 0 in the temporal expression of the modified velocity vector V'(t). One can determine whether the signal structure present in the negative temporal abscissas (estimated for example as energy (denoted "NRJ" in FIG. 7) and given for example by the integral of the signal at negative times) remains greater than a threshold THR, as illustrated by way of example in FIG. 6B, even if an improvement relative to the preceding FIG. 6A can be observed.

In this case, the method can be repeated by taking the rough estimate of the DoA(n) obtained previously (S752), to determine a reference component D(f) (denoted D(n) for iteration n of the method in step S762) whose directivity allows representing the direction of the direct sound more selectively than its estimate D(n−1) in the previous iteration, and replacing (S772) the latter D(n−1) in the estimation of the general velocity vector V'(f), then V'(t) in step S782. Thus, the directivity of a reference component more selectively "captures" the estimated direction of the direct sound than a reference component in a previous iteration. In this embodiment, we do not necessarily have ambisonic orders greater than 1 and yet we can adjust both the orientation and the shape of the directivity to better capture the direct sound and thus capture fewer of certain reflections for example.

Figure 6C:
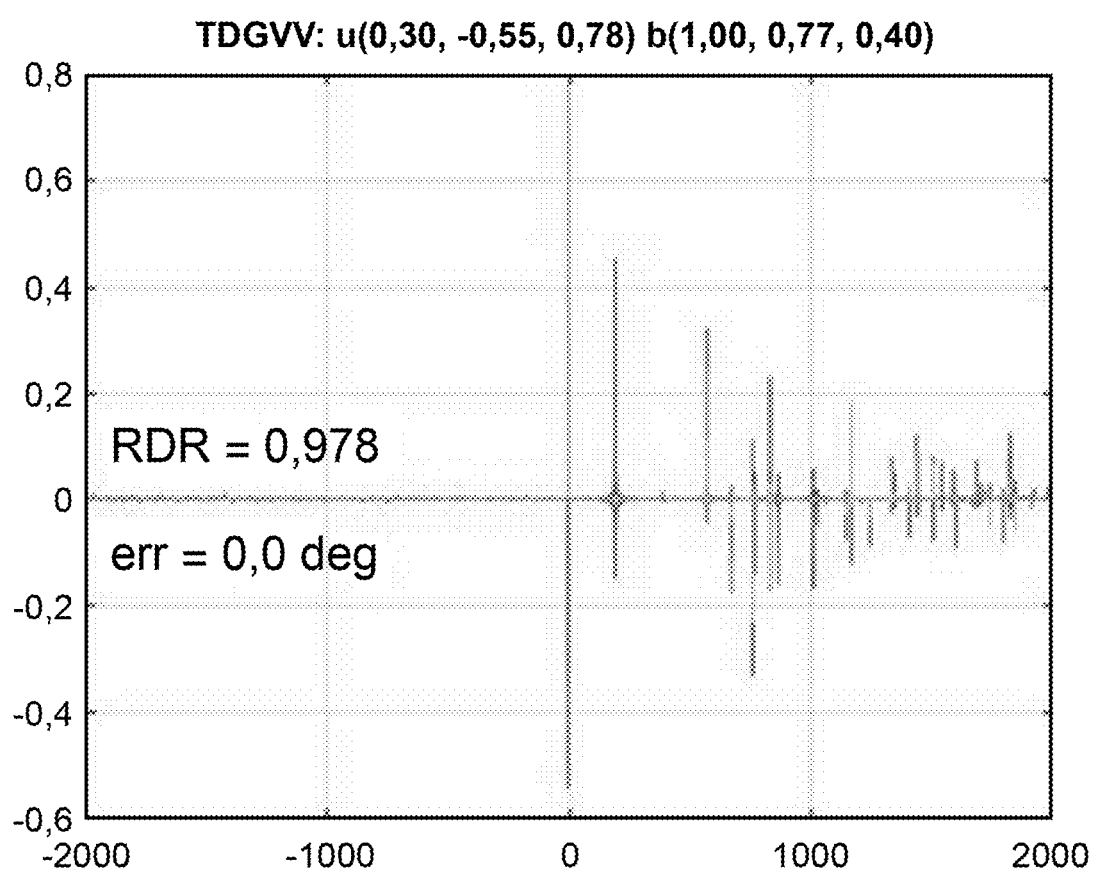

The method can thus be repeated until the peaks at negative times are lower in amplitude or energy than the chosen threshold THR, as illustrated in FIG. 6C.

Figure 6D:
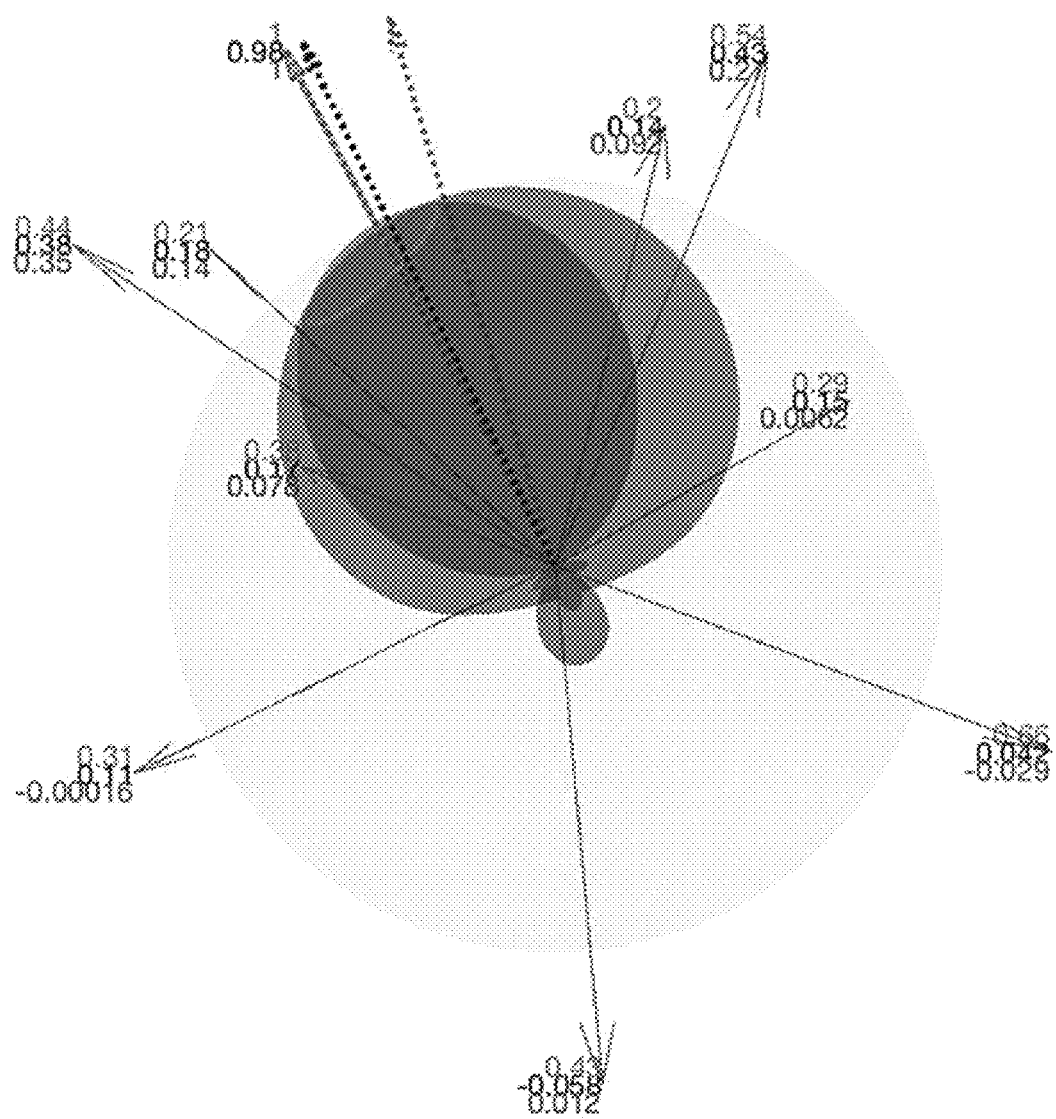
FIG. 6D illustrates highly schematically and by way of illustration the form of the reference component D(f) appearing in the denominator of the expression of the general velocity vector V'(f), over several successive iterations of the method, and FIG. 7 schematically represents the steps of an iterative method within the meaning of the invention, according to an embodiment given here by way of example.

Thus, an increasing selectivity towards the direct sound is successively imparted to the component which is in the denominator of the velocity vector (conventional then general) as the iterations progress, in its first-order expression. In FIG. 6D, we thus transition from the omnidirectional W component in the form of a sphere (in light gray), to a more selective component D(1) having in this example the form of a supercardioid in darker grey, then to D(2) having a narrower supercardioid shape in very dark grey.

Figure 7:
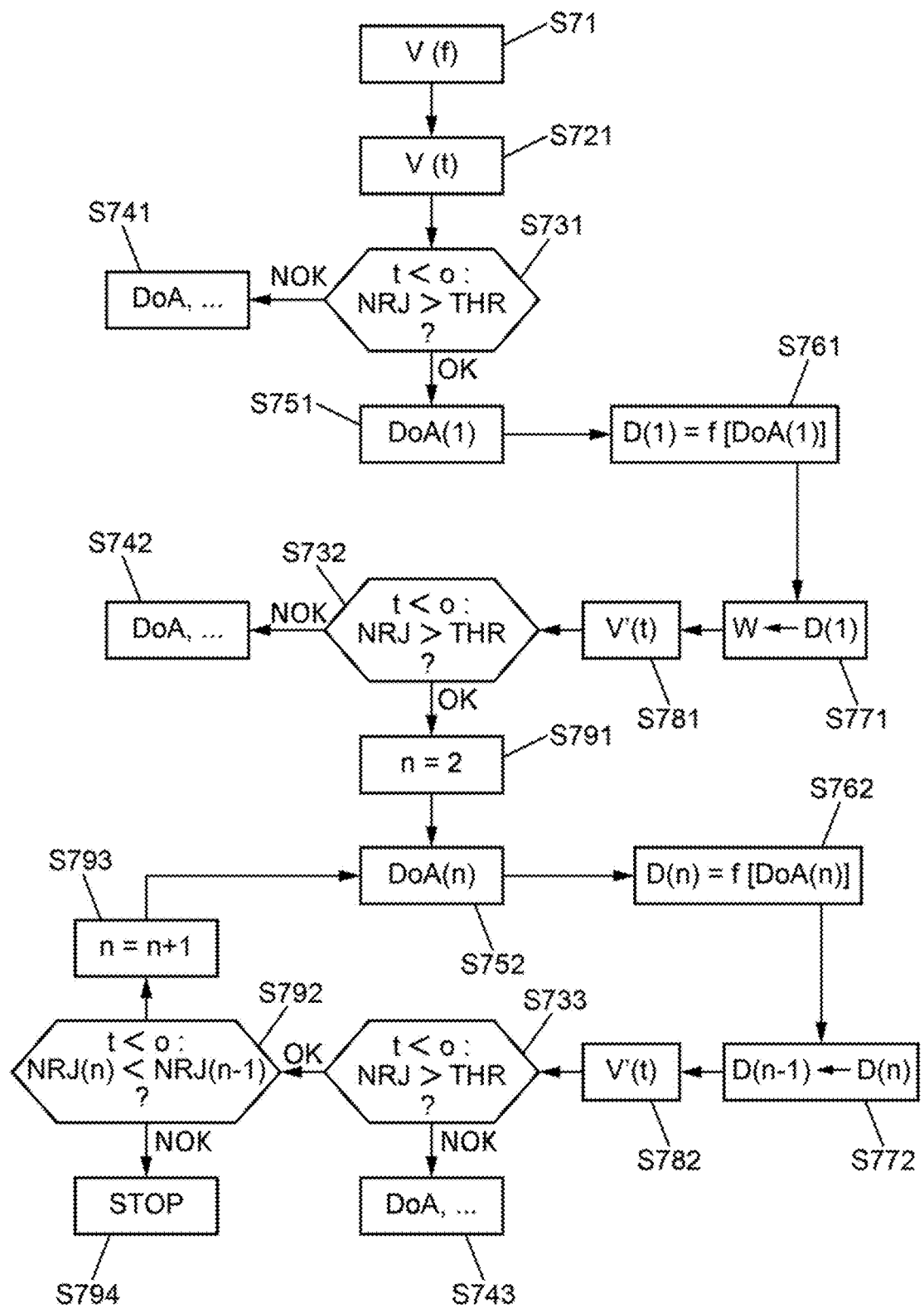

Returning to the method illustrated in FIG. 7 but in greater detail, the first step S71 begins with constructing the conventional velocity vector in the frequency domain V(f) with the omnidirectional component W(f) in its denominator. In step S721, its expression V(t) in the time domain is estimated. Then, if in test S731 a signal structure is identified representing the temporal expression of the conventional velocity vector V(t) with peaks such that the energy NRJ of this signal structure at negative temporal abscissas (t<0) remains below a fixed threshold THR (NOK arrow), then the present acoustic situation already allows deriving an unbiased DoA directly from the conventional velocity vector. In this case, the parameters DoA, U0, U1, etc. can be determined in step S741 as described above. Otherwise (OK arrow exiting test S731), the direct estimation of the DoA by the conventional velocity vector is biased, and at least a first iteration (n=1) must be carried out in which the velocity vector is refined in order to determine a general velocity vector, as described below.

From this DoA estimate, even biased (obtained at step S751), a reference component D(1) is estimated in step S761 in the frequency domain, to replace in step S771 the omnidirectional component W(f) in the expression of the now "general" velocity vector V'(f). In step S781, the temporal expression of the general vector V'(t) is estimated in order to determine in test S732 whether there remains significant energy (greater than the threshold THR) in the signal structure of this expression V'(t) at negative temporal abscissas. If such is not the case (NOK arrow exiting test S732) the process can stop at this first iteration by giving parameters DoA, etc. to step S742. Otherwise, the process is repeated, by updating the iteration index n of the process in step S791 (here, the steps denoted S79x are relative to iterations of the process, with the incrementing of index n (step S793) or determining the termination of the process S792-S794).

As above, on the basis of the rough DoA estimated in the previous iteration (step S752), a new reference component D(n) is estimated in step S762, to replace the old reference component D(n−1) in the denominator of the general velocity vector V'(f) in step S772. From this new expression of the general velocity vector V'(f) in the frequency domain, its expression in the time domain V'(t) is determined in step S782. The comparison of its signal structure (the energy relative to the threshold THR) in test S733 is repeated, to determine whether or not the new DoA which can be estimated from this would be biased. If such is not the case (NOK arrow exiting test S733), then parameters, in particular DoA, etc., can be obtained in step S743, here after three iterations as in the illustrative example of FIGS. 6A to 6C. Otherwise (OK arrow exiting test S733), the process must again be reiterated from step S752 using the last estimated DoA, even though rough and possibly biased.

An example of a possible calculation of the reference component D(f) from a previously estimated DoA is described below. In a formalism such as the one presented in the equations in the Annex, component $D_\theta(f)$ typically derives from a matrixing (or from a sum weighted by a vector $D_\theta$) of the ambisonic components:

$$D_\theta(f) = D_\theta \cdot B(f), \text{ where}$$

B(f) is a vector of signals describing an ambisonic field in the frequency domain, for example such as B(f)=[ ... $B_{mn}^\circ(f)$ ... ] where $B_{mn}^\circ(f) = S(f) \cdot Y_{mn}^\circ(\vec{u})$, in the case of a plane wave carrying a signal S(f) and coming from a direction described by the unit vector it, such that for the mix of direct and indirect waves concerned we have $B(f) = S(f) \Sigma_{n=0}^N \gamma_n(f) \cdot Y(\vec{u}_n)$, where $Y(\vec{u})$ is the vector of the spherical harmonic coefficients $Y_{mn}^\circ(\vec{u})$, and $D_\theta$ can be a vector of the 'steering vector' type, causing beamforming generally oriented in a particular direction θ (which can also be designated by a unit vector $\vec{u}$), such that $$B(f) = s(f) \Sigma_{n=0}^N \gamma_n(f) \cdot Y(\vec{u}_n),$$

$$D_\theta(f) = S(f) \Sigma_{n+0}^N \gamma_n(f) \cdot g_\theta(\vec{u}_n),$$

by defining a 'steering gain' such that:

$$g_\theta(\vec{u}_n) = D_\theta \cdot Y(\vec{u}_n)$$

Up to the first order, the spherical function $g_\theta(\vec{u}_n)$ is axially symmetric, the available degrees of freedom only influencing the proportion between positive and negative lobes (if any) in addition to the orientation. Starting from the second order and according to the coefficients of vector $D_\theta$, the main lobe (presumably in the targeted direction) is not necessarily symmetric, and secondary lobes can have more varied shapes and orientations. Therefore, despite the $D_\theta$ notation, the beamforming is not parameterized solely by the targeted main direction θ.

In the particular case of a directivity formed with axial symmetry, this is in the form: $D_\theta = Y(\theta) \cdot \text{Diag}(g_{beamshape})$ The gain $g_\theta(\vec{u}_n)$ is then expressed as a polynomial $P_{beamshape}(\bullet)$ of the scalar product $\vec{u} \cdot \vec{u}_n$ (a variant of the Legendre polynomial):

$$g_\theta(\vec{u}_n) = Y(\vec{u}) \cdot \text{Diag}(g_{beamshape}) \cdot Y(\vec{u}_n) = P_{beamshape}(\vec{u} \cdot \vec{u}_n)$$

The diagonal coefficients $g_{beamshape}$ can take into account:
on the one hand, the choice of ambisonic encoding convention, therefore the calculation of the spherical harmonic functions Y(li);
and on the other hand, criteria for playing with the shape of the beam by refining the chosen shape of the beam by means of the choice of these diagonal coefficients (fineness and proportion of the main and secondary lobes, for example).

For these aspects, it is useful to refer to the thesis document of Jerome Daniel (2000), in particular to pages 182 to 186 and to FIG. 3.14, where the tools proposed for spatial decoding are directly applicable to directivity construction from ambisonic signals as shown here for the D reference component.

According to such a formalism, note that it is possible to define gain coefficients to give selectivity to the component D(f) expressed above as a function of $g_{beamshape}$.

With reference again to FIG. 7, it should be noted that depending on the acoustic situations, it is possible that no form is found for the general velocity vector V'(t) in the time domain having a good "causal" aspect, and therefore no good DoA estimate. Referring again to FIG. 7, a termination criterion is added by way of example for exiting iterations of the process when it no longer improves the shape of the signal illustrating the general velocity vector V'(t) in the time domain. Thus, if at the end of a previous iteration, in test S733, the energy of this signal is still greater than the threshold THR in the negative temporal abscissas (t<0), and if the iterations of the process do not (or no longer) improve the estimation of the general velocity vector V'(t), which can be indicated both by:
signal energies above the threshold THR for negative times, and
signal energies that do not decrease from one iteration n−1 to the next n (NOK arrow exiting test S792),
then the iterations of the process can stop at step S794.

Otherwise (OK arrow exiting test S792), the process can be executed for a subsequent iteration in step S793, starting by incrementing the iteration counter n.

To minimize the occurrence of the case where the process must stop at step S794 due to lack of convergence towards an unbiased DoA solution, in such a "worst" acoustic situation, it is possible to take the teachings of the aforementioned document FR1911723, for solutions which allow for example isolating the best frames for increasing the chances of an unbiased determination (frames of signal onset for example).

Indeed, as described in document FR1911723, depending on the relative significance of this problem, one can evaluate to what extent vector U0 offers a reasonable estimate of DoA (weakly biased), thus providing a confidence factor for the estimation and making it possible to preferentially retain the estimation made on certain frames. When the risk of estimation bias proves to be excessive, the frames least exposed to this problem can be selected, as described below with reference to FIGS. 3A and 3B.

The embodiments described below can then be applied to the estimation of the conventional velocity vector in particular, for example during a first iteration of the process described above with reference to FIG. 7. Already described in document FR1911723, such processing to be applied to the conventional velocity vector is therefore recalled below.

One can therefore proceed to observing the first peaks for a given room, by the frequency analysis of temporal subframes. The frames where signal onsets are located (rising energy, transient, etc.) are those which allow observing an acoustic mix involving only the earliest wave fronts: the direct sound and one or more reflections (so that the aforementioned "sum of the gammas" remains less than 1 according to Eq.38).

For the frames containing signal onsets, it is possible to adjust (possibly dynamically) the temporal window for the frequency analysis, for example by giving it an asymmetrical and generally decreasing shape, so that the "bump" of the window gives more weight to the rising edge of the signal (onset, transient) therefore to the direct sound, and progressively less weight (in an approximately exponential manner for example, but this is not required). The amplitude of later wave fronts relative to the earlier wave fronts is thus artificially reduced, and the convergence condition of the Taylor series is approached, ensuring a unidirectional temporal expansion.

An example of a decreasing exponential type of temporal windowing is presented below, to be applied to the analyzed signal in order to bring the analysis of the resulting temporal fingerprint to a favorable case without substantial bias in the estimation of the waves' directions of arrival. We perform the operation, valid from a time to designated as time 0 for convenience, and preferably corresponding to the moment of a signal onset preceded by silence, as in equation Eq.42, with ALPHA>0, and, by reintegrating the convolutional form involving s(t) and h(t), we find the form of equation Eq.43.

Equation Eq.44 then involves the exponential function property for which this choice is justified, resulting in the form given in Eq.45, which amounts to establishing equation Eq.46.

Therefore if we model the impulse response by a set of specular reflections added to the direct sound, we obtain equation Eq.47.

Thus, if the sum of the gammas is greater than or equal to 1 (with a possibility of a "bidirectional series"), it is always possible to determine an attenuation factor ALPHA such that the sum of the gains thus "adapted" (Eq.48) becomes less than 1.

We then observe that the temporal fingerprint is unidirectional in nature, which is made evident by peaks solely for positive times after the decreasing exponential window is applied (lower part of FIG. 5B). We also observe that in practice the energy of the observed signal decreases very quickly with the exponential, the numerical impact—on the estimates—of a truncation of said signal becoming quite negligible beyond a relatively short truncation time. In other words, in the shorter term we obtain the advantages of a long-term analysis which encompasses both the entire exciter signal and its reverberation. Indeed, the observed "TDVV" conforms to the interference model without the errors due to the dynamics of the signal. The weighting by such a window therefore possesses a dual property, which ideally allows obtaining an exploitable temporal fingerprint.

In practice, not knowing the amplitude of the reflections in advance, it is necessary to determine the ALPHA attenuation, preferably seeking a compromise between a value low enough to ensure unidirectionality of the temporal fingerprint and a value that is not too low in order to avoid reducing the chances of detecting and estimating indirect waves. For example, this value can be determined in terms of the attenuation factor $a_{EXP}$ by a duration $t_{EXP}$ which is physically representative of the observed phenomena (typically 5 ms) such that $ALPHA = -(\log a_{EXP})/t_{EXP}$ An iterative process (for example by dichotomy) can be implemented to adjust the attenuation value. Above a threshold attenuation value, when the obtained temporal fingerprint is detected as bidirectional, therefore presumably with a biased vector U0, the analysis is repeated with a stronger attenuation, otherwise at least the estimate of U0 is adopted and if the following peaks are not very discernible (because they are reduced with the attenuation) then the analysis is repeated with an intermediate attenuation between the two previous ones, and so on if necessary until vector U1 can be estimated.

Nevertheless, the approach of an exponentially decreasing window can be sensitive to interferences, particularly at the start of the windowing where they are significantly amplified. Interference other than noise may simply be the reverberation of the source itself at the start of the windowing if it was activated shortly before. It is then possible to introduce denoising processing in order to reduce such interference.

In general, temporal windows of different shapes and/or sizes can be provided, or even an overlap between windows in order to maximize the chances of obtaining a "favorable fingerprint".

An initial DFT size is chosen that is generally larger than this analysis window.

Of course, this is in a context of processing digital audio signals, sampled at a given sampling frequency, in the form of successive blocks (or "frames") of samples.

It is also possible to optionally provide preprocessing with detection of onsets, transients, etc., then time-frequency denoising, for example by defining a mask (time-frequency filter, possibly binary), so as to avoid introducing elements from other ambient and/or diffuse field sources into the interference fingerprint. It is necessary to calculate the impulse response of the mask (result of the inverse transform) to verify the influence of the mask on the analysis of the peaks. Alternatively, it can be integrated into a frequency weighting of the fingerprint of a concerned frame to be stored, so as to subsequently calculate a weighted average of frequency fingerprints presumably corresponding to similar interfering mixes (typically at signal onsets, by verifying that the source concerned has not moved, which can be surmised through estimation of the delays).

We thus then proceed to extracting and observing the peaks, for example according to norm |V(t)|: a maximum peak, then the next, give TAU1 (in general), etc.

We then proceed to diagnosis of the temporal fingerprint, by detecting (according to {tau_n} and V(sum(k_n·tau_n))):
  if there is temporal re-looping (a kind of circular "aliasing") due to the choice of an FFT on a too-short temporal support,
  if there is a progressive unidirectional series, or conversely a bidirectional series, or if we are in the particular case of a series without notable attenuation (when the sum of the gains sum(gn) remains close to 1) or even of a retrograde series (when at least one implicit gain g_n>1).

We can then:
assign a "good frame" or "good fingerprint" score (allowing a reliable estimate, presumably without DoA bias, because unidirectional), and store it,
make the estimate (Un), and
adjust the analysis upstream as needed by choosing an appropriate temporal window.

An analysis of the temporal fingerprint was described above, but a frequency analysis can be carried out more simply as follows.

It is easy to show mathematically that the peak at time zero is, by construction, equal to the average of the velocity vector over its complete spectrum (the real part canceling out by Hermitian symmetry), or even its real part if we only consider positive frequencies. We can estimate that it is then pointless to calculate an inverse transform of the FDVV to have an estimate of the DoA if we are only interested in the direct sound. Time-based examination of the TDVV, however, allows detecting whether this DoA is reliable (criterion of development towards positive and increasing times).

This favorable case is more plausibly observed during onsets of the source signal, when the mix is still not very complex. In general, it is sufficient to make the estimate over these moments.

Moreover, in practice, the frequency and temporal fingerprints of the VV are not always identifiable in an ideal model of the interfering wave mix. It may be that the source signal does not sufficiently or does not always excite a significant range of frequencies at key moments, due to a lack of transmitted power, possibly taking into account the concurrency of other components of the captured sound field (insufficient SNR or SIR). This can be linked to more or less diffuse background sound (other sound sources), microphonic noise.

We can then apply processing according to at least one of the following or several of them in combination:
selection of time-frequency samples with signal onset detection according to advanced algorithms,
smoothing the velocity vector over several frames (average of V(f) weighted for example by the $|W(f)|^2$ of the frames in question and a forgetting factor, possibly dynamic), possibly via the intensity vector,
calculate an average of V(f) weighted by $|W(f)|^2$ over a selection of signal onset frames (if the extracted delays are identical), to supplement the frequency fingerprint and consolidate the temporal fingerprint.

To economize in the calculations, it can also be recommended to carry out the calculations of TDVV, or even, upstream, of FDVV, only for the frames detected as being more consistent in their information: for example the signal onset frames if in situations where they are detectable by simple processing, in which case it is even advantageous to position the analysis window over the rising edge of the signal.

For a good estimation of non-integer delays (fractional delay and its multiples in the time series), a peak estimation by inter-sample interpolation and/or a local frequency analysis (by isolating the peak over a temporally constricted neighborhood) can be considered, and the delay can be fine-tuned based on the phase response.

A preliminary selection of temporal peaks can be made based on a current estimate of the delays characteristic of the series.

Figure 3A:
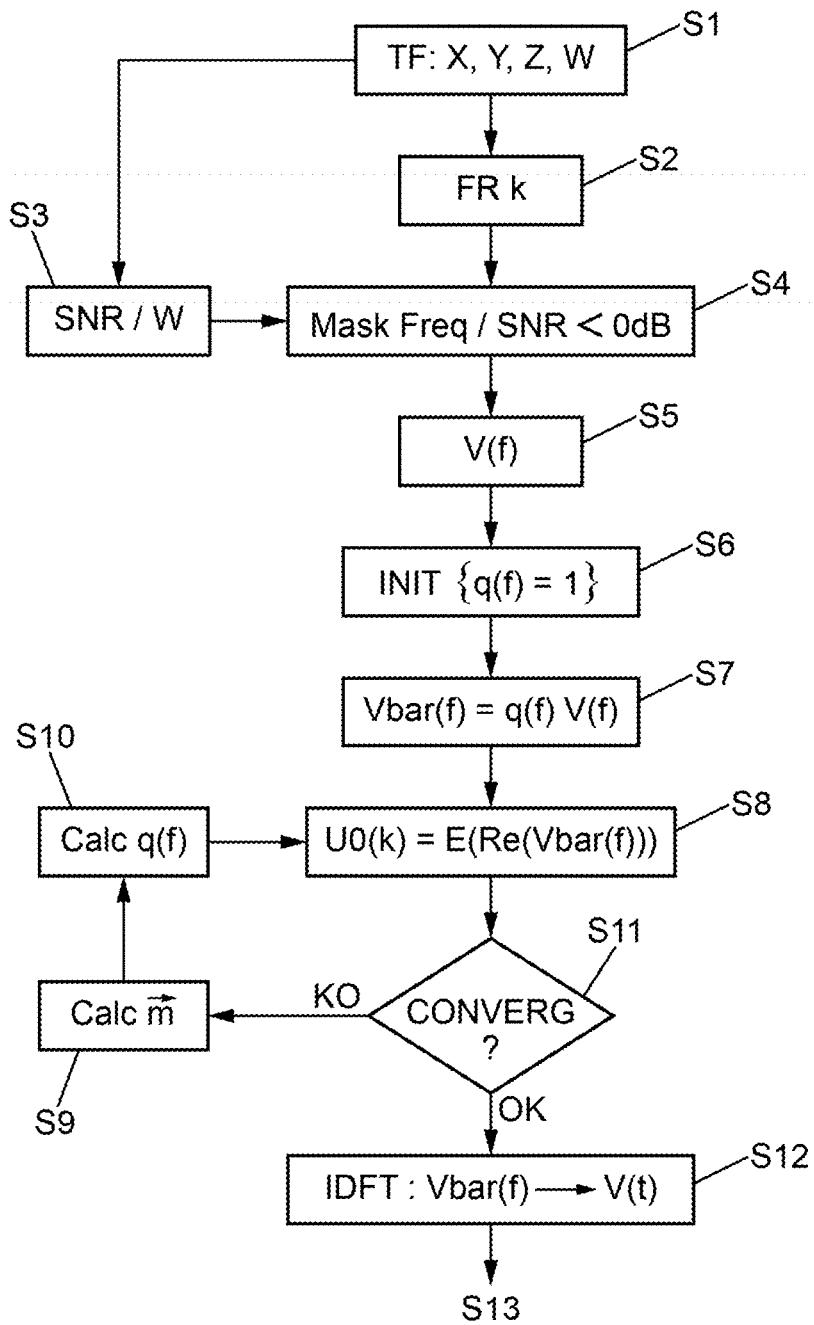
FIG. 3A shows the beginning steps in an algorithmic processing to determine the relevant parameters U0, d0, etc.
Figure 3B:
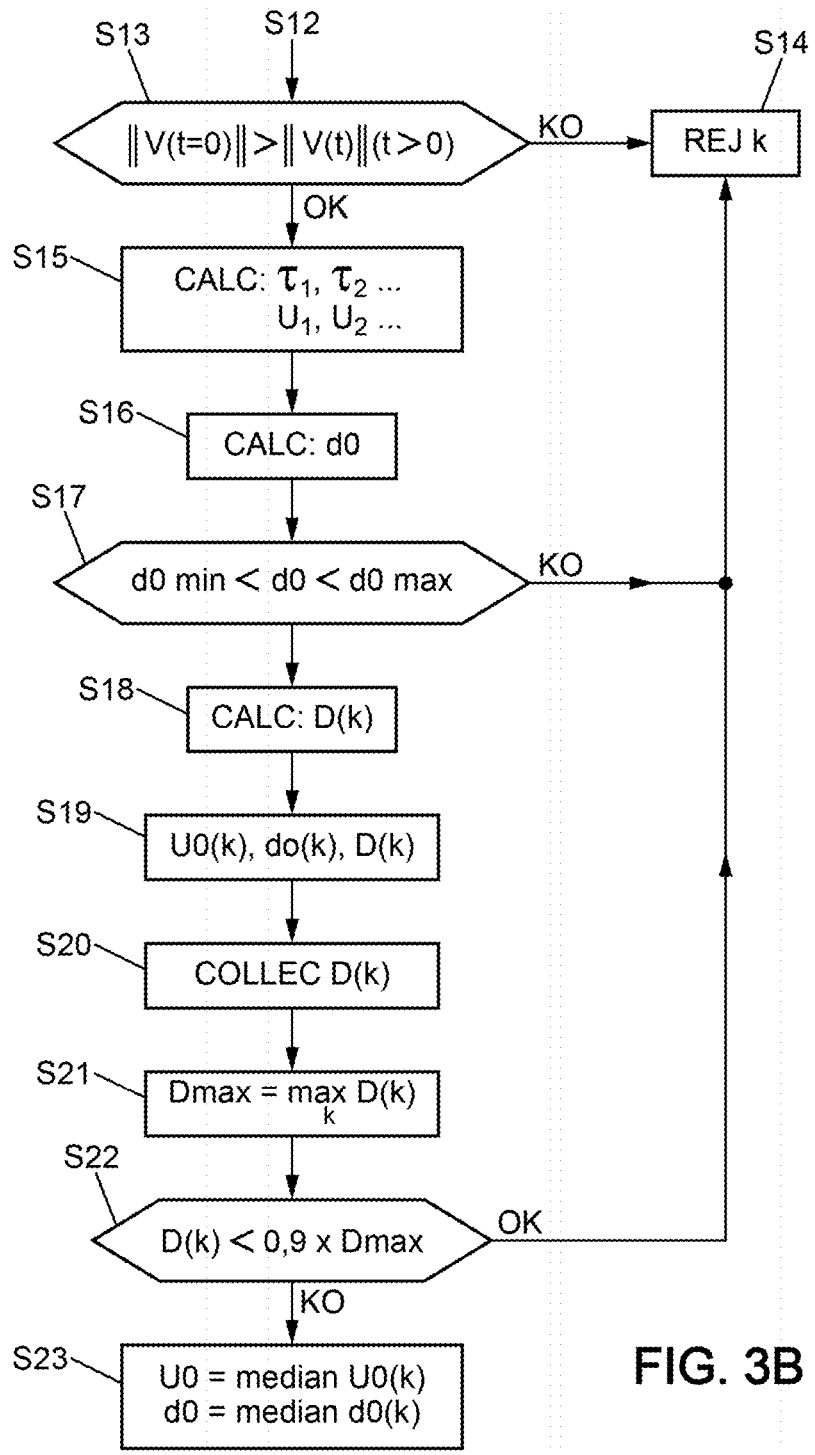
FIG. 3B shows the continuation of the processing steps of FIG. 3A.
Figure 4:
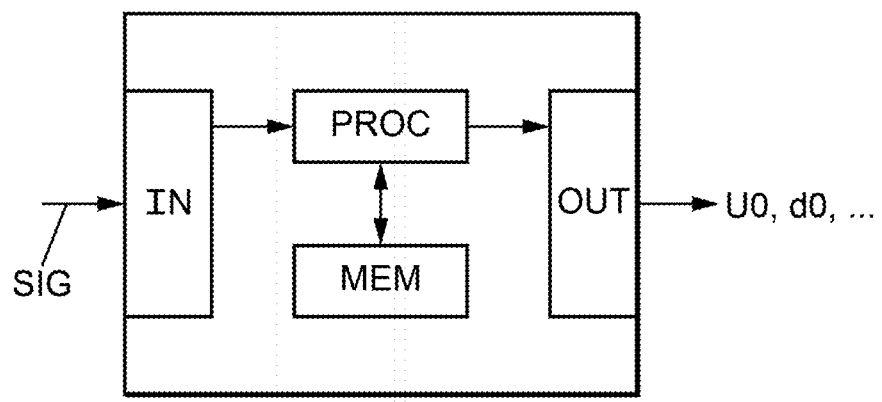
FIG. 4 schematically shows a device within the meaning of the invention according to one embodiment.

The implemented steps can thus be summarized in one possible exemplary embodiment as illustrated in FIGS. 3A and 3B. In step S1, the Fourier transform (from time to frequency) of the ambisonic signals is calculated, which can be in the form of a succession of "frames" (blocks of successive samples). For each transformed frame k (step S2), a dynamic mask can be applied to some of the frequency bands for which the signal-to-noise ratio is below a threshold (some frequency bands can in fact be highly noisy, for example due to a noise inherent in the microphone or other, such that exploitation of a signal picked up in this frequency band is compromised). In particular, the search for noise by frequency band is carried out in step S3 preferentially on the "omni" component W, and the frequency bands altered by the noise (beyond a threshold for example such as SNR<0 dB) are masked (i.e. set to zero) in step S4.

Then, in step S5, the velocity vector V(f) is calculated in the frequency domain, for example by equation Eq.6 (or in the form of Eq.11, Eq.18, or Eq.20).

Here, in one exemplary embodiment, we apply weights q(f) calculated as described below to give more or less importance to frequency bands f. Such an implementation allows expressing the velocity vector V(f) in frequency bands where its evolution is significant. To do so, the optimum weights are iteratively calculated as a function of U0 and V(f). Thus, returning to the algorithmic processing of FIG. 3A, in step S6 the various weights q(f) are set to 1. In step S7, we apply the weighting q(f) applied to V(f) per band, so that Vbar(f)=q(f)V(f). In step S8, U0 is determined for each frame k, such that:
U0(k)=E(Re(Vbar(f))), where E(x) here is by way of example the expectation of x, which is thus similar to an average over all the frequencies of the real part of the estimated velocity vector Vbar(f).

Of course, this first estimate of U0(k) is rough. It is iteratively refined by calculating the weights with respect to the previous determination of U0(k), using equation Eq.49 based on the imaginary part of vector V(f), and where vector m is a unit vector normal to the plane defined by vector U0 and a normal to the wall (direction z of FIG. 1 for example). Vector m is also estimated iteratively as a function of U0 in step S9, then the weights are calculated by Eq.49 in step S10. The weights found are applied in step S7, and the estimation of U0 is refined until convergence at the output of test S11. At this stage, U0(k) has been estimated for the different frames.

U1 can be deduced from this, by a relation such as Eq.41 described above. In the variant described here, U1 is determined by equations Eq.50 to Eq.52, having previously applied an inverse transform IDFT (from frequency to time) in step S12 to vector Vbar(f) found in step S7, to obtain a time-based representation V(t) of the velocity vector. Such an embodiment makes it possible, as seen above with reference to FIG. 2, to identify the various delays TAU1, TAU2, etc. in case of different reflective surfaces. The first delay TAU1 is identified because this is a first peak of V(t) in the time following the instant of reception of the direct path. Thus, in equation Eq.51, tmax(k) is the instant that maximizes the modulus of V(t)k calculated for frame k.

Test S13 checks for each frame that the modulus of V(t=0) is indeed greater than that of V(t) for t>0. A frame not satisfying this condition is discarded in step S14. The various delays, TAU1 then TAU2, are next determined in step S15 (by removing from the moduli of V(t)k to be compared in Eq.51, those corresponding to delay TAU1), etc. The delay TAUm is given by the component tmax found at each iteration m, divided by the sampling frequency fs in accordance with Eq.52, taking into account that times t and tmax(k) are first expressed in terms of the sample index (time zero being taken as a reference for index zero). Vectors U1, U2, etc., can then also be calculated, with equation Eq.50.

The other parameters can also be determined, in particular d0 given by Eq.28 in step S16 (by next verifying, in test S17, a consistency with conventional room data such as d0min=0, and d0max=5m; otherwise the frame contains an error and can be discarded in step S14).

Step S18 can consist of selecting the "good" frames, representative of a sound onset with first reflections. The criterion D(k) for selecting such frames can be illustrated by way of example by equation Eq.53 where $C(f)_i^{(k)}$ designates a magnitude (amplitude in absolute value) detected on ambisonic channel i, in the time-frequency sample (t, f) resulting from the first transform (time to frequency) of frame k. Epsilon designates a non-zero positive value, to avoid a zero in the denominator in the absence of a signal.

F designates the total number of frequency sub-bands used.

It is thus possible to retain in step S22 only the frames whose criterion D(k) calculated from Eq.53 is not smaller than 90% of the maximum Dmax found in step S21 among the criteria for all the frames D(k).

Thus, in step S18, the D(k) values are calculated for all the frames, then in step S19, the processing delivers U0(k), d0(k), D(k) for the various frames. In step S20, the D(k) values are collected in order to identify the highest in step S21 and to eliminate in step S22 the frames whose D(k) value is less than 0.9 Dmax.

Finally, in step S23, the retained vector U0 here is preferably the median (rather than the mean) among the vectors U0 of the various frames retained. The retained distance d0 is also the median value among the distances d0 of the various frames retained.

Of course, the invention is not limited to the embodiments described above by way of example; it extends to other variants.

An application to a processing of first-order ambisonic (FOA) signals has been described above. The order can be higher, for enrichment in terms of spatial resolution.

Indeed, we described above a first-order ambisonic representation, but it is possible to provide higher orders. In such case, the velocity vector calculation is increased by the ratios of higher order directional components to component W(f), and the vectors Un are implicitly increased by as many dimensions. Increasing the dimensions (beyond 3) and therefore the spatial resolution allows better differentiation of the vectors U0, U1, . . . Un from each other, and easier detection, in the temporal fingerprint, of the peaks V(k*TAUn) which are proportional to (U0-Un), even when vectors U0 and Un are angularly close, which occurs in the case of grazing reflections (when the source is distant and/or close to the ground for example). This therefore makes it possible to more accurately estimate the desired parameters U0, U1, d0, etc. It should also be specified that the fact that only the three first-order components (X, Y, Z) are retained here in the numerator is independent of the fact that it is possible to utilize components of higher order(s) available for constructing the reference component in the denominator. In all cases (regardless of the denominator), one can consider improving the above processing (as well as the processing presented in FR1911723) by adding components of higher order(s) to the numerator, thus increasing the dimensionality of the velocity vector and in particular allowing better differentiation of its peaks in the time domain.

More generally, the velocity vector can be replaced by a ratio between components of a spatial acoustic representation that is "coincident" in the frequency domain and can work in a coordinate system characteristic of said spatial representation.

To mitigate the cases for example of multiple sources, the calculation of TDVV can be utilized more generally in association with Artificial Intelligence methods, including neural networks. Some training strategies envisaged (for example on fingerprints from models or on windowed SRIR, and not necessarily from original signals) can allow the network to learn to make use of the succession of frames in order to improve detections and estimates related to given room situations.

Furthermore, we have described above, with reference to FIGS. 6A to 6D and 7, the possibility of initially estimating the conventional velocity vector V(f) in order to determine a first rough estimate of the DoA and then refining the estimate of the general velocity vector V'(f) based on this rough estimate in order to give a more accurate DoA. Of course, this is simply an example of one possible implementation. In a variant, for example, it is possible to immediately divide the space into several sectors, thus giving a directivity to the component in the denominator D(f) in each of these sectors, and to attempt a convergence in the calculation of the DoA with iterative methods (of the type in FIG. 7 starting from step S761 where D(1) would simply be calculated as a function of the angular sector considered), these iterative methods being carried out in parallel for each of these sectors. This is one possible example implementation. Alternatively, the "best" (or several best) angular sector could be selected according to the criterion of validity of the causal model presented above, then the estimates optimized in the direction or directions selected, including in terms of variants in form in the denominator. Indeed, more generally, one can further envisage evaluating, in a first step and/or during subsequent steps, a plurality of general velocity vectors respectively associated with variously formed directivities (in the denominator).

More generally, the search for a beamforming that gives a reliable direction of arrival of the sound (or DoA) can be approached as a general problem of optimization and in this capacity can call upon a variety of strategies. We can therefore identify:

a minimization criterion (a function to be minimized) which expresses/predicts the validity of the causal model. In a somewhat simplistic and therefore improvable manner, this concerns, in the above description, the search for the relative energy of the signal in the negative temporal abscissas;

the parameters to be optimized are the beamforming parameters, formulated for example as the coefficients of the matrix D involved in equations Eq. A1 and A4, or as direction Theta (θ) and the beam shape parameters $g_{beamshape}$ of equation EQ.A5 when opting for axial symmetry or in the case of being restricted to the first order;

a set (or sets) of initial parameters, typically an "omni" directivity ($g_{beamshape}$=[1 0 . . . ]); or a favorable directivity stored during previous uses; or else a multiplicity of directivities pointing in a set of directions representative of the space, in addition even expressing different forms of directivity;

a principle of adjusting the parameters tested (during the iterations) because typically a reorientation of the acoustic beam in the last estimated DoA is not always a sufficiently robust choice: it is then necessary, rather than stopping the algorithm due to lack of improvement, to start again from one of the stored situations (and presumably the best from the minimization criterion point of view) and to adjust the parameters along another axis (for example a form of directivity parameter) or another combination of axes.

More generally, the usual approaches, including for example that of the stochastic gradient or batch optimizations can be considered; the number of iterations induced may involve a significant cost, however.

It should be added that unlike common optimization tasks, the parameters ultimately targeted (typically the Un vectors) are not directly those that are optimized, but ones resulting from them. It should be noted that there are then potentially many different sets of beamforming parameters which could all be 'optimal' in the sense that they result in compliance with a causal model. Consequently, they all allow deducing the same set of parameters Un in a presumably accurate manner.

Annex $$b(t) = \begin{bmatrix} w(t) \\ x(t) \\ y(t) \\ z(t) \end{bmatrix} \quad \text{Eq.1}$$

$$b(t) = s_1(t) \begin{bmatrix} 1 \\ x_{\vec{u}_1} \\ y_{\vec{u}_1} \\ z_{\vec{u}_1} \end{bmatrix} = s_1(t) \begin{bmatrix} 1 \\ \vec{u}_1 \end{bmatrix}, \vec{u}_1 = [x_{\vec{u}_1} \ y_{\vec{u}_1} \ z_{\vec{u}_1}]^T \quad \text{Eq.2}$$

$$B(f) = \begin{bmatrix} W(f) \\ X(f) \\ Y(f) \\ Z(f) \end{bmatrix} \quad \text{Eq.3}$$

$$B(f) = S_1(f) \begin{bmatrix} 1 \\ \vec{u}_1 \end{bmatrix} \quad \text{Eq.4}$$

$$\{\vec{u}_n, S_n(f)\}_{n=1,N} : B(f) = \sum_{n=1}^{N} S_n(f) \begin{bmatrix} 1 \\ \vec{u}_n \end{bmatrix} \quad \text{Eq.5}$$

$$\vec{V}(f) = \frac{1}{W(f)} \begin{bmatrix} X(f) \\ Y(f) \\ Z(f) \end{bmatrix} \quad \text{Eq.6}$$

$$\vec{I}(f) = W^*(f) \begin{bmatrix} X(f) \\ Y(f) \\ Z(f) \end{bmatrix}; \vec{V}(f) = \frac{1}{|W(f)|^2} \vec{I}(f) \quad \text{Eq.7}$$

$$h(t) = \begin{bmatrix} h_W(t) \\ h_X(t) \\ h_Y(t) \\ h_Z(t) \end{bmatrix} \quad \text{Eq.8}$$

$$\vec{u}_n = [h_X(\tau_n) \ h_Y(\tau_n) \ h_Z(\tau_n)] / h_W(\tau_n) \quad \text{Eq.9-1}$$

$$b(t) = s(t) * h(t) = \begin{bmatrix} s(t) * h_W(t) \\ s(t) * h_X(t) \\ s(t) * h_Y(t) \\ s(t) * h_Z(t) \end{bmatrix} \quad \text{Eq.9-2}$$

$$B^{LT}(f) = \mathcal{F}[b(t)](f) = \begin{bmatrix} W^{LT}(f) \\ X^{LT}(f) \\ Y^{LT}(f) \\ Z^{LT}(f) \end{bmatrix} \quad \text{Eq.10}$$

$$H^{LT}(f) = \begin{bmatrix} H_W^{LT}(f) \\ H_X^{LT}(f) \\ H_Y^{LT}(f) \\ H_Z^{LT}(f) \end{bmatrix}; B^{LT}(f) = S^{LT}(f) \cdot H^{LT}(f)$$

$$\vec{V}^{LT}(f) = \frac{1}{W^{LT}(f)} \begin{bmatrix} X^{LT}(f) \\ Y^{LT}(f) \\ Z^{LT}(f) \end{bmatrix} = \frac{1}{H_W^{LT}(f)} \begin{bmatrix} H_X^{LT}(f) \\ H_Y^{LT}(f) \\ H_Z^{LT}(f) \end{bmatrix} \quad \text{Eq.11}$$

$$h(t) = h_{early}(t) + h_{late}(t) = \sum_{n=0}^{N} g_n \cdot \delta(t - \tau_n) \cdot \begin{bmatrix} 1 \\ \vec{u}_n \end{bmatrix} + h_{late}(t) \quad \text{Eq.12}$$

$$g_0 = 1; \tau_0 = 0 \quad \text{Eq.13}$$

$$H_{early}(f) = \sum_{n=0}^{N} g_n \cdot e^{-j2\pi f \tau_n} \cdot \begin{bmatrix} 1 \\ \vec{u}_n \end{bmatrix} = \sum_{n=0}^{N} \gamma_n(f) \cdot \begin{bmatrix} 1 \\ \vec{u}_n \end{bmatrix}; \quad \text{Eq.14}$$

$$\gamma_n = \gamma_n(f) = g_n \cdot e^{-j2\pi f \tau_n}$$

$$\gamma_0 = 1 \quad \text{Eq.15}$$

$$B(f) = S(f) \sum_{n=0}^{N} g_n \cdot e^{-j2\pi f \tau_n} \cdot \begin{bmatrix} 1 \\ \vec{u}_n \end{bmatrix} = S(f) \sum_{n=0}^{N} \gamma_n(f) \cdot \begin{bmatrix} 1 \\ \vec{u}_n \end{bmatrix} \quad \text{Eq.16}$$

$$\vec{V}^{ST}(T,f) = \frac{1}{W^{ST}(T,f)} \begin{bmatrix} X^{ST}(T,f) \\ Y^{ST}(T,f) \\ Y^{ST}(T,f) \end{bmatrix} = \frac{W^{ST}(T,f)^*}{|W^{ST}(T,f)|^2} \begin{bmatrix} X^{ST}(T,f) \\ Y^{ST}(T,f) \\ Y^{ST}(T,f) \end{bmatrix} \quad \text{Eq.17}$$

$$\vec{V}^{ST}(T,f) = \frac{W^{ST}(T,f)^*}{|W^{ST}(T,f)|^2 + \epsilon} \begin{bmatrix} X^{ST}(T,f) \\ Y^{ST}(T,f) \\ Y^{ST}(T,f) \end{bmatrix} \quad \text{Eq.18}$$

$$h^{smx}(t) = \sum_{n:332 \geq 0}^{N} g_n \cdot \delta(t - \tau_n) \cdot \begin{bmatrix} 1 \\ \vec{u}_n \end{bmatrix}; \quad \text{Eq.19}$$

$$H^{smx}(f) = \sum_{n=0}^{N} g_n \cdot e^{-j2\pi f \tau_n} \cdot \begin{bmatrix} 1 \\ \vec{u}_n \end{bmatrix}$$

$$\vec{V}^{ST}(T,f) \cong \vec{V}^{smx}(f) = \frac{1}{H_W^{smx}(f)} \begin{bmatrix} H_X^{smx}(f) \\ H_Y^{smx}(f) \\ H_Z^{smx}(f) \end{bmatrix} \quad \text{Eq.20}$$

$$B(f) = S(f) \begin{bmatrix} 1 + \gamma_1(f) \\ \vec{u}_0 + \gamma_1(f)\vec{u}_1 \end{bmatrix} \quad \text{Eq.21}$$

$$\vec{V}(f) = \vec{V} = \frac{\vec{u}_0 + \gamma_1 \vec{u}_1}{1 + \gamma_1} \quad \text{Eq.22}$$

$$\mathcal{R}(\vec{V}) = \frac{\vec{V} + \vec{V}^*}{2} = \frac{(\vec{u}_0 + \gamma_1 \vec{u}_1)(1 + \gamma_1^*) + (\vec{u}_0 + \gamma_1^* \vec{u}_1)(1 + \gamma_1)}{2|1 + \gamma_1|^2} = \quad \text{Eq.23}$$

$$\vec{u}_0 + \frac{|\gamma_1|^2 + \mathcal{R}(\gamma_1)}{|1 + \gamma_1|^2}(\vec{u}_1 - \vec{u}_0) = \vec{u}_0 + \frac{g_1^2 + g_1 \cos(2\pi f \tau_1)}{1 + 2g_1 \cos(2\pi f \tau_1) + g_1^2}(\vec{u}_1 - \vec{u}_0)$$

$$\mathcal{J}(\vec{V}) = \frac{\vec{V} - \vec{V}^*}{2j} = \frac{\mathcal{J}(\gamma_1)}{|1 + \gamma_1|^2}(\vec{u}_1 - \vec{u}_0) = \frac{g_1 \sin(2\pi f \tau_1)}{1 + 2g_1 \cos(2\pi f \tau_1) + g_1^2}(\vec{u}_1 - \vec{u}_0)$$

$$\mathcal{R}(\vec{V}_{mean}) = \vec{u}_0; \quad \text{Eq.24}$$

$$\vec{V}_{maxproba} = \frac{\vec{u}_0 + g_1 \vec{u}_1}{1 + g_1} \quad \text{Eq.25}$$

$$d_0 \cos \varphi_0 = d_1 \cos \varphi_1 \quad \text{Eq.26}$$

$$d_1 - d_0 = \tau_1 c \quad \text{Eq.27}$$

$$d_0 = \frac{\tau_1 c}{\frac{\cos \varphi_0}{\cos \varphi_1} - 1} \quad \text{Eq.28}$$

$$z_0 = d_0 \frac{\sin \varphi_0 - \sin \varphi_1}{2}; \quad \text{Eq.29}$$

$$z_{mic} = z_0 - d_0 \sin \varphi_0 \quad \text{Eq.30}$$

$$\vec{V}(t) = \mathcal{F}^{-1}[\vec{V}(f)](t) \quad \text{Eq.31}$$

$$\frac{1}{1-x} = 1 + x + x^2 + x^3 + \cdots = \sum_{k \geq 0} x^k; x = -\gamma_1; |\gamma_1| < 1 \quad \text{Eq.32}$$

$$\vec{V}(f) = (\vec{u}_0 + \gamma_1 \vec{u}_1) \sum_{k \geq 0} (-\gamma_1)^k = \quad \text{Eq.33}$$

$$\vec{u}_0 + \sum_{k \geq 0} (-\gamma_1)^k (\vec{u}_0 - \vec{u}_1) = \vec{u}_0 + \sum_{k \geq 1} (-g_1)^k e^{-j2\pi f \tau_1} (\vec{u}_0 - \vec{u}_1)$$

$$\vec{V}(t) = \delta(t)\vec{u}_0 + \sum_{k \geq 1} \delta(t - k\tau_1)(-g_1)^k (\vec{u}_0 - \vec{u}_1) \quad \text{Eq.34}$$

$$\vec{V} = \frac{\vec{u}_0 + \sum_{n=1}^{N} \gamma_n \vec{u}_n}{1 + \sum_{n=1}^{N} \gamma_n} = (\vec{u}_0 + \sum_{n=1}^{N} \gamma_n \vec{u}_n) \sum_{k \geq 0} \left(\sum_{n=1}^{N} -\gamma_n\right)^k \quad \text{Eq.35}$$

$$\sum_{k \geq 0} \left(\sum_{n=1}^{N} -\gamma_n\right)^k = \sum_{k_1, k_2, \cdots k_N \geq 0} \frac{(k_1 + k_2 + \cdots + k_N)!}{k_1! k_2! \ldots k_N!} \prod_{n=1}^{N} (-\gamma_n)^{k_n} \quad \text{Eq.36}$$

$$\vec{V} = \vec{u}_0 + \sum_{n=1}^{N} \left(\sum_{k \geq 1} (-\gamma_n)^k (\vec{u}_0 - \vec{u}_n)\right) + SC \quad \text{Eq.37}$$

$$\left|\sum_{n=1}^{N} \gamma_n(f)\right| < 1 ; \sum_{n=1}^{N} |g_n| < 1 \quad \text{Eq.38}$$

$$\vec{V}(t) = \delta(t)\vec{u}_0 + \sum_{n=1}^{N} \left(\sum_{k \geq 1} \delta(t - k\tau_n)(-g_n)^k\right)(\vec{u}_0 - \vec{u}_n) + SARC \quad \text{Eq.39}$$

$$\{k_n \geq 0\}_{n=1:N}; \tau_{new} = \sum_{n}^{N} k_n \tau_n; TAUN + 1 = \tau_{N+1} = \tau_{new} \quad \text{Eq.40}$$

$$\vec{u}_1 = \sum u \to_0 -2(\vec{u}_0 \cdot \vec{n})\vec{n} \quad \text{Eq.41}$$

$$\tilde{b}(t) = b(t) \cdot e^{-\alpha t} \quad \text{Eq.42}$$

$$\tilde{b}(t) = e^{-;6-;t} s(t) * h(t) = e^{-\alpha t} \int_{\tau \geq 0} s(t - \tau) h(\tau) d\tau \quad \text{Eq.43}$$

$$e^{-\alpha t} = e^{-\alpha(t - \tau)} \cdot e^{-\alpha \tau} \quad \text{Eq.44}$$

$$\tilde{b}(t) = \int_{\tau \geq 0} s(t - \tau) e^{-\alpha(t - \tau)} \cdot h(\tau) e^{-\alpha \tau} d\tau \quad \text{Eq.45}$$

$$\tilde{b}(t) = \int_{\tau \geq 0} \tilde{s}(t - \tau)\tilde{h}(\tau)d\tau = \tilde{s}(t) * \tilde{h}(t)(\tilde{s}(t) = s(t) \cdot e^{-\alpha t}; \tilde{h}(t) = h(t) \cdot e^{-\alpha t}) \quad \text{Eq.46}$$

$$\tilde{h}(t) = \sum_{n=0}^{N} g_n \cdot e^{-\alpha \tau_n} \cdot \delta(t - \tau_n) \cdot \begin{bmatrix} 1 \\ \vec{u}_n \end{bmatrix} = \sum_{n=0}^{N} \tilde{g}_n \cdot \delta(t - \tau_n) \cdot \begin{bmatrix} 1 \\ \vec{u}_n \end{bmatrix} (\tilde{g}_n = g_n \cdot e^{-\alpha \tau_n} < g_n) \quad \text{Eq.47}$$

$$\sum_{n=1}^{N} |\tilde{g}_n| < 1. \quad \text{Eq.48}$$

$$q(f) = \exp\left(-\frac{|\mathcal{J}(\vec{V}(f)) \cdot m|}{\|\mathcal{J}(\vec{V}(f))\|}\right) \quad \text{Eq.49}$$

$$u_1 = u_0 - \frac{2u_0 \cdot v_{max}(k)}{\|v_{max}(k)\|^2} v_{max}(k) \quad \text{Eq.50}$$

$$t_{max}(k) = \underset{t>0}{\text{argmax}} \|V(t)_k\| \quad \text{Eq.51}$$

$$\hat{\tau}_1 = \frac{t_{max}(k)}{f_s} \quad \text{Eq.52}$$

$$D(k) = \max\left(0, \frac{1}{4F} \sum_{f=0}^{F-1} q(f) \sum_{i=0}^{3} \frac{C(f)_i^{(k+1)} - C(f)_i^{(k-1)}}{\max(C(f)_i^{(k+1)}, C(f)_i^{(k-1)}) + \epsilon}\right) D(k) \geq 0.9 \max_k D(k) \quad \text{Eq.53}$$

$$D_\Theta(f) = D_\Theta \cdot B(f) \quad \text{Eq.A1}$$

$$B(f) = S(f) \sum_{n=0}^{N} \gamma_n(f) \cdot Y(\vec{u}_n) Y(\vec{u}) = [\ldots Y_{mn}^\sigma(\vec{u}) \ldots] \quad \text{Eq.A2}$$

$$D_\Theta(f) = S(f) \sum_{n=0}^{N} \gamma_n(f) \cdot g_\Theta(\vec{u}_n) \quad \text{Eq.A3}$$

$$g_\Theta(\vec{u}_n) = D_\Theta \cdot Y(\vec{u}_n) \quad \text{Eq.A4}$$

$$D_\Theta = Y(\Theta) \cdot Diag(g_{beamshape}) \quad \text{Eq.A5}$$

$$g_\Theta(\vec{u}_n) = Y(\vec{u}) \cdot Diag(g_{beamshape}) \cdot Y(\vec{u}_n) = P_{beamshape}(\vec{u} \cdot \vec{u}_n) \quad \text{Eq.A6}$$

$$\beta_n = g_n'(\vec{u}_n) = \frac{g_\Theta(\vec{u}_n)}{g_\Theta(\vec{u}_0)} \quad v_0 = \frac{1}{g_\Theta(\vec{u}_0)} \quad \text{Eq.B1}$$

$$\vec{V}_\Theta = v_0 \frac{\vec{u}_0 + \sum_{n=1}^{N} \gamma_n \vec{u}_n}{1 + \sum_{n=1}^{N} \gamma_n \cdot \beta_n} = v_0 (\vec{u}_0 + \sum_{n=1}^{N} \gamma_n \vec{u}_n) \sum_{k \geq 0} \left(\sum_{n=1}^{N} -\gamma_n \cdot \beta_n\right)^k \quad \text{Eq.B2} = 35b$$

$$\left|\sum_{n=1}^{N} \gamma_n \cdot \beta_n\right| < 1 \quad \text{Eq.B3} = 35b$$

$$\vec{V}_\Theta(t) = \delta(t) v_0 \vec{u}_0 + v_0 \sum_{n=1}^{N} \left(\sum_{k \geq 1} \delta(t - k\tau_n)(-g_n \beta_n)^k\right)\left(\vec{u}_0 - \frac{1}{\beta_n}\vec{u}_n\right) + SARC \quad \text{Eq.B4} = 39b$$

$$\vec{u}_0 = \frac{1}{v_0} \vec{V}_\Theta(0) \quad avec \quad v_0 = |\vec{V}_\Theta(0)| \quad \text{Eq.B5}$$

$$\vec{V}_\Theta(k\tau_n) = v_0 \cdot (-g_n \beta_n)^k \left(\vec{u}_0 - \frac{1}{\beta_n}\vec{u}_n\right) \quad \text{Eq.B6}$$

$$\vec{V}_\Theta(2\tau_n) = (-g_n \beta_n) \vec{V}_\Theta(\tau_n) \quad \text{Eq.B7}$$

$$\rho = -g_n \beta_n = (\vec{V}_\Theta(\tau_n) \cdot \vec{V}_\Theta(2\tau_n)) / |\vec{V}_\Theta(\tau_n)|^2 \quad \text{Eq.B8}$$

$$\vec{V}_\Theta(\tau_n) = v_0 \cdot \rho\left(\frac{1}{v_0}\vec{V}_\Theta(0) - \frac{1}{\beta_n}\vec{u}_n\right) \quad \text{Eq.B9}$$

$$\vec{V}_\Theta(\tau_n) - \rho \vec{V}_\Theta(0) = -\frac{v_0 \cdot \rho}{\beta_n}\vec{u}_n = \frac{v_0}{g_n}\vec{u}_n \quad \text{Eq.B10}$$

Although the present disclosure has been described with reference to one or more examples, workers skilled in the art will recognize that changes may be made in form and detail without departing from the scope of the disclosure and/or the appended claims.

The invention claimed is:

1. A method for processing audio signals acquired by at least one microphone, with a view to locating at least one sound source in a space comprising at least one wall, wherein the method is implemented by at least one device and comprises:
    applying a time-frequency transform to the acquired signals,
    generating, on the basis of the acquired signals, a general velocity vector V'(f) expressed in the frequency domain, estimated from an expression of a velocity vector V(f) in which a reference component D(f) other than an omnidirectional component W(f) appears in a denominator of said expression, said expression being complex with a real part and an imaginary part, the general velocity vector V'(f) characterizing a composition between:
        a first acoustic path, direct between the source and the microphone, represented by a first vector U0, and
        at least a second acoustic path resulting from a reflection on the wall and represented by a second vector U1,
    the second path having, at the microphone, a first delay TAU1 relative to the direct path,
    determining, as a function of the delay TAU1, the first vector U0, and the second vector U1, at least one parameter among:
        a direction of the direct path,
        a distance d0 from the source to the microphone,
        a distance z0 from the source to said wall.
2. The method according to claim 1, comprising implementing a plurality of iterations in at least part of which the general velocity vector V'(f) is used, having, in its denominator, a reference component D(f) determined based on an approximation of the direction of the direct path obtained in a previous iteration.

3. The method according to claim 2, comprising a first iteration in which the velocity vector V(f) is used instead of the general velocity vector V'(f), the velocity vector V(f) being expressed in the frequency domain and having the omnidirectional component W(f) appear in the denominator, in order to determine, at the end of this first iteration, at least a first approximation of the direction of the direct path, and wherein, for at least a second iteration subsequent to the first iteration, the general velocity vector V'(f) is used, estimated from an expression of the velocity vector V(f) in which the omnidirectional component W(f) in the denominator is replaced by the reference component D(f), the reference component D(f) being spatially more selective than the omnidirectional component W(f).

4. The method according to claim 3, wherein the reference component D(f) is more selective than the omnidirectional component W(f), in a direction corresponding to said first approximation of the direction of the direct path.

5. The method according to claim 2, wherein the iterations are repeated until convergence is reached according to a predetermined causality criterion.

6. The method according to claim 5, wherein, in each iteration:
an inverse transform, from frequencies to time, is also applied to said expression of the general velocity vector V'(f) in order to obtain, in the time domain, a succession of peaks each linked to a reflection on at least one wall, in addition to a peak linked to arrival of the sound along said direct path, and
a new iteration is carried out if, in the succession of peaks, a signal appears whose temporal abscissa is less than that of the direct path peak and whose amplitude is greater than a chosen threshold,
the causality criterion being satisfied if the amplitude of the signal is lower than said threshold.

7. The method according to claim 5, wherein, said signal having an amplitude, the iterations are terminated:
in a first case where the amplitude of said signal is lower than the chosen threshold, and
in a second case where repetition of the iterations does not lead to a significant reduction in the amplitude of said signal.

8. The method according to claim 7, wherein the second case is followed by implementing the following steps, the acquired signals being delivered in the form of successive frames of samples:
for each frame, a score is estimated for the presence of sound onset in the frame, and
the frames with scores higher than a threshold are selected for processing the audio signals acquired in the selected frames.

9. The method according to claim 1, wherein the acquired signals are picked up by an ambisonic microphone, and wherein the velocity vector V(f) is expressed in the frequency domain by first-order ambisonic components in a form of the type:

$V(f)=1/W(f)[X(f),Y(f),Z(f)]^T$,

W(f) being the omnidirectional component,
and the general velocity vector V'(f), expressed in the frequency domain by first-order ambisonic components, is presented in a form of the type:

$V(f)=1/D(f)[X(f),Y(f),Z(f)]^T$,

D(f) being said reference component which is other than the omnidirectional component.

10. The method according to claim 1, comprising determining an estimate of the direction of the direct path, which is equivalent to the first vector U0, from an average over a set of frequencies of the real part of the general velocity vector V'(f) expressed in the frequency domain.

11. The method according to claim 1, comprising:
applying an inverse transform, from frequencies to time, to the general velocity vector in order to express it in the time domain V'(t),
searching for at least one maximum in the expression of the general velocity vector V'(t) max as a function of time, after a duration of the direct path, and
deducing the first delay TAU1, corresponding to the time giving the maximum V'(t) max.

12. The method according to claim 11, comprising:
estimating the second vector U1 as a function of values of the normalized velocity vector V' which are recorded at time indices t=0, TAU1, and 2×TAU1, in order to define a vector V1 such that:

$V1=V'(TAU1)-((V'(TAU1) \cdot V'(2 \times TAU1))/\|V'(TAU1)\|^2) V'(0)$, vector U1 then being given by: $U1=V1/\|V1\|$.

13. The method according to claim 12, comprising:
determining respective angles PHI0 and PHI1 of the first vector U0 and of the second vector U1 with respect to said wall, such that:
PHI0=arcsin(U0·nR) and PHI1=arcsin(U1·nR), where nR is a unit vector and normal to the wall, and
determining a distance d0 between the source and the microphone as a function of the first delay TAU1, by a relation of the type:
d0=(TAU1×C)/((cosPHI0/cosPHI1)−1), where C is the speed of sound.

14. The method according to claim 13, comprising determining the distance z0 from the source to said wall by a relation of the type:
z0=d0(sinPHI0−sinPHI1)/2.

15. The method according to claim 1, wherein the space comprises a plurality of walls and the method comprises:
applying an inverse transform, from frequencies to time, to the general velocity vector in order to express the general velocity vector in the time d0 main V'(t) in the form of a succession of peaks,
identifying in the succession of peaks, peaks linked to a reflection on a wall among said plurality of walls, each identified peak having a temporal abscissa that is a function of a first delay TAUn of the acoustic path resulting from the reflection on the corresponding wall n, relative to the direct path,
determining, as a function of each first delay TAUn, of the first vector U0, and of each second vector Un representing an acoustic path resulting from a reflection on a wall n, at least one parameter among:
the direction of the direct path,
the distance d0 from the source to the microphone, and
at least one distance zn from the source to the wall n.

16. The method according to claim 15, wherein the peaks linked to a reflection on a wall n have temporal abscissas that are multiples of the delay TUn associated with this wall n, and wherein a first portion of peaks having the smallest positive temporal abscissas are preselected in order to identify the peaks in said portion that are each associated with a single reflection on a wall.

17. A device for processing audio signals, comprising:
a processing circuit which is configured to implement a method for processing audio signals acquired by at least one microphone, with a view to locating at least one sound source in a space comprising at least one wall, wherein the method comprises:
applying a time-frequency transform to the acquired signals,
generating, on the basis of the acquired signals, a general velocity vector V'(f) expressed in the frequency domain, estimated from an expression of a velocity vector V(f) in which a reference component D(f) other than an omnidirectional component W(f) appears in a denominator of said expression, said expression being complex with a real part and an imaginary part, the general velocity vector V'(f) characterizing a composition between:
  a first acoustic path, direct between the source and the microphone, represented by a first vector U0, and
  at least a second acoustic path resulting from a reflection on the wall and represented by a second vector U1,
  the second path having, at the microphone, a first delay TAU1 relative to the direct path,
determining, as a function of the delay TAU1, the first vector U0, and the second vector U1, at least one parameter among:
  a direction of the direct path,
  a distance d0 from the source to the microphone,
  a distance z0 from the source to said wall.

18. A non-transitory computer readable storage medium storing instructions of a computer program causing implementation of a method for processing audio signals acquired by at least one microphone, with a view to locating at least one sound source in a space comprising at least one wall, when said instructions are executed by a processor of a processing circuit, wherein the method comprises:
applying a time-frequency transform to the acquired signals,
generating, on the basis of the acquired signals, a general velocity vector V'(f) expressed in the frequency domain, estimated from an expression of a velocity vector V(f) in which a reference component D(f) other than an omnidirectional component W(f) appears in a denominator of said expression, said expression being complex with a real part and an imaginary part, the general velocity vector V'(f) characterizing a composition between:
  a first acoustic path, direct between the source and the microphone, represented by a first vector U0, and
  at least a second acoustic path resulting from a reflection on the wall and represented by a second vector U1,
  the second path having, at the microphone, a first delay TAU1 relative to the direct path,
determining, as a function of the delay TAU1, the first vector U0, and the second vector U1, at least one parameter among:
  a direction of the direct path,
  a distance d0 from the source to the microphone,
  a distance z0 from the source to said wall.

* * * * *